INVENTOR
William L. Pettigrew
John D. McDaniels
Frank J. Reagan
BY
ATTORNEYS

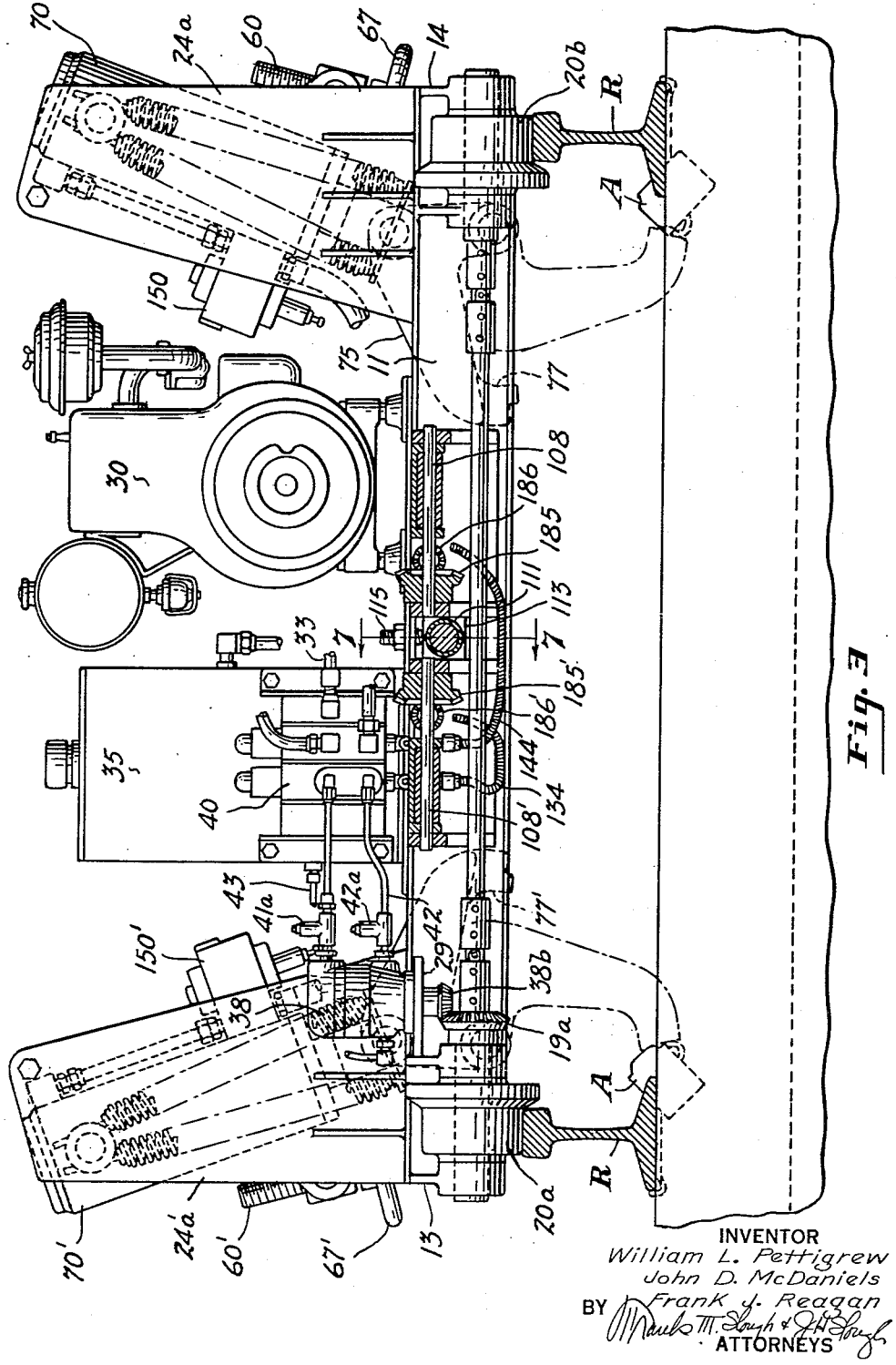

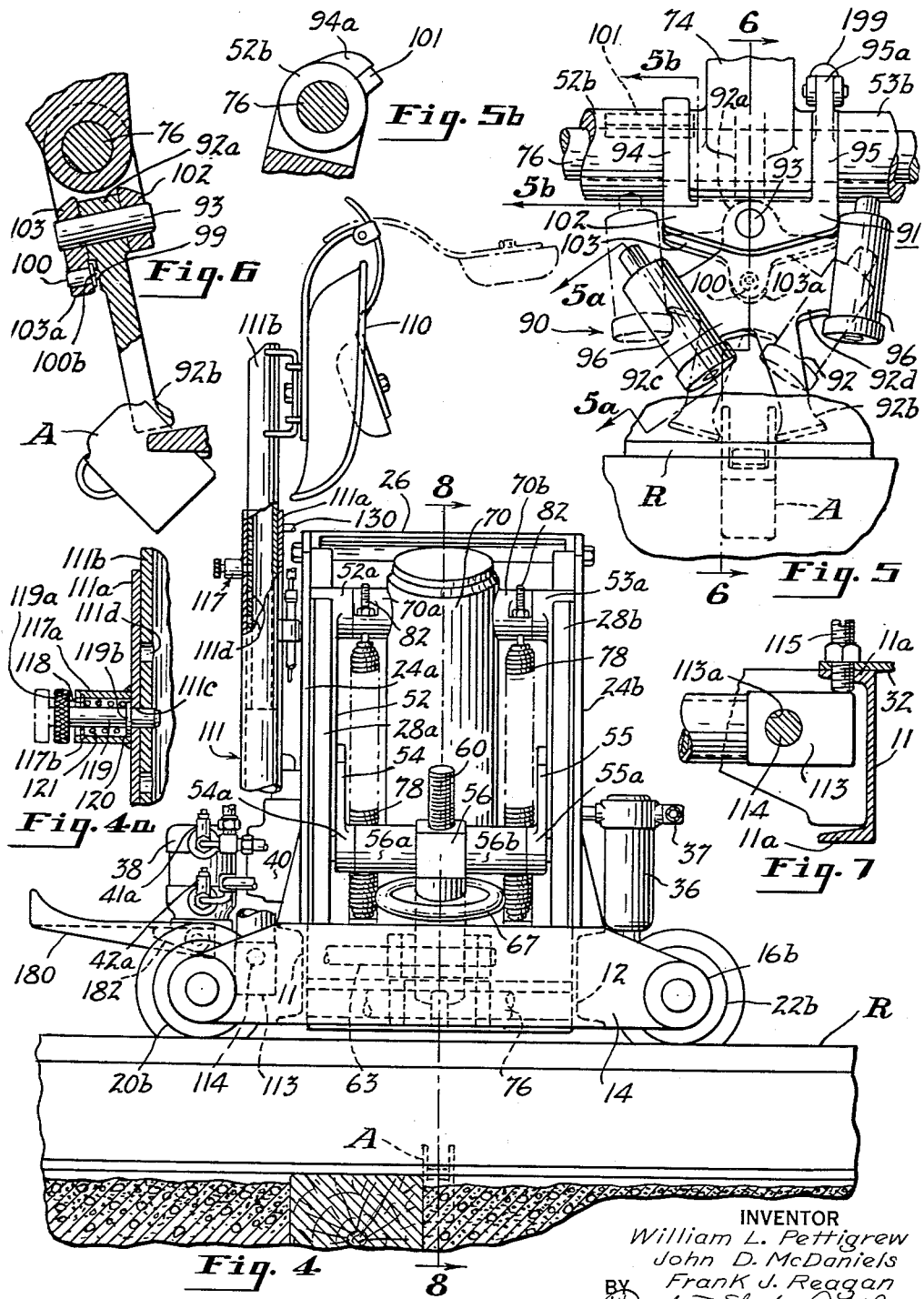

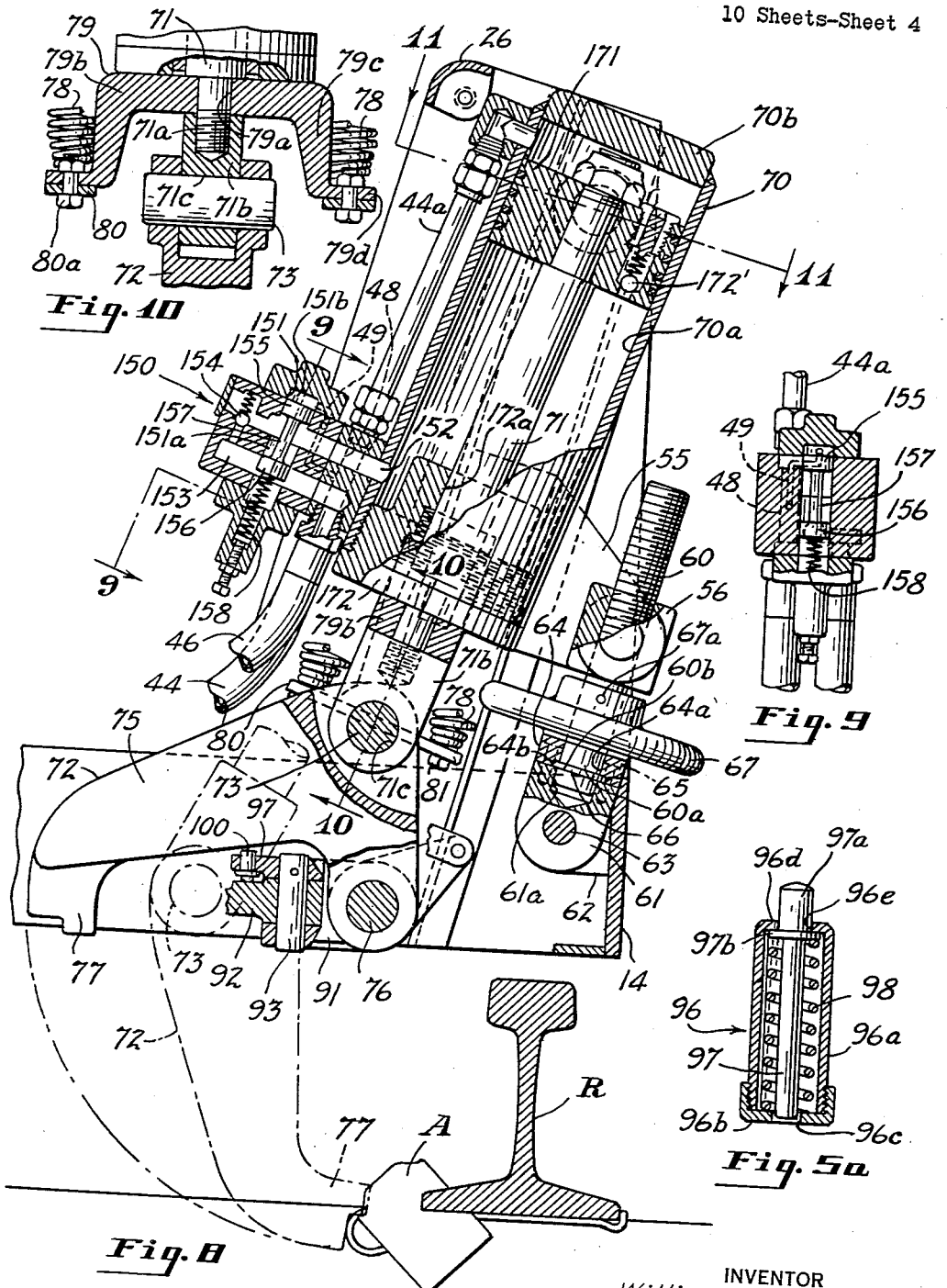

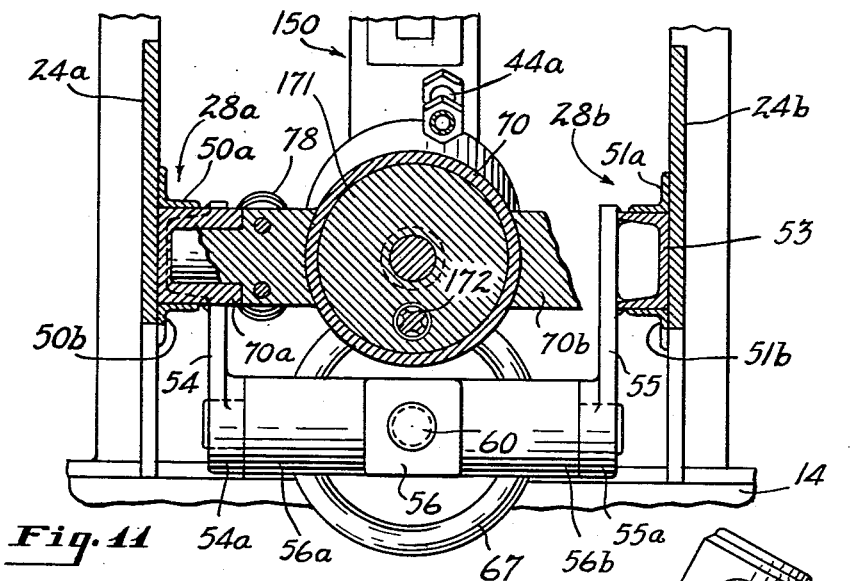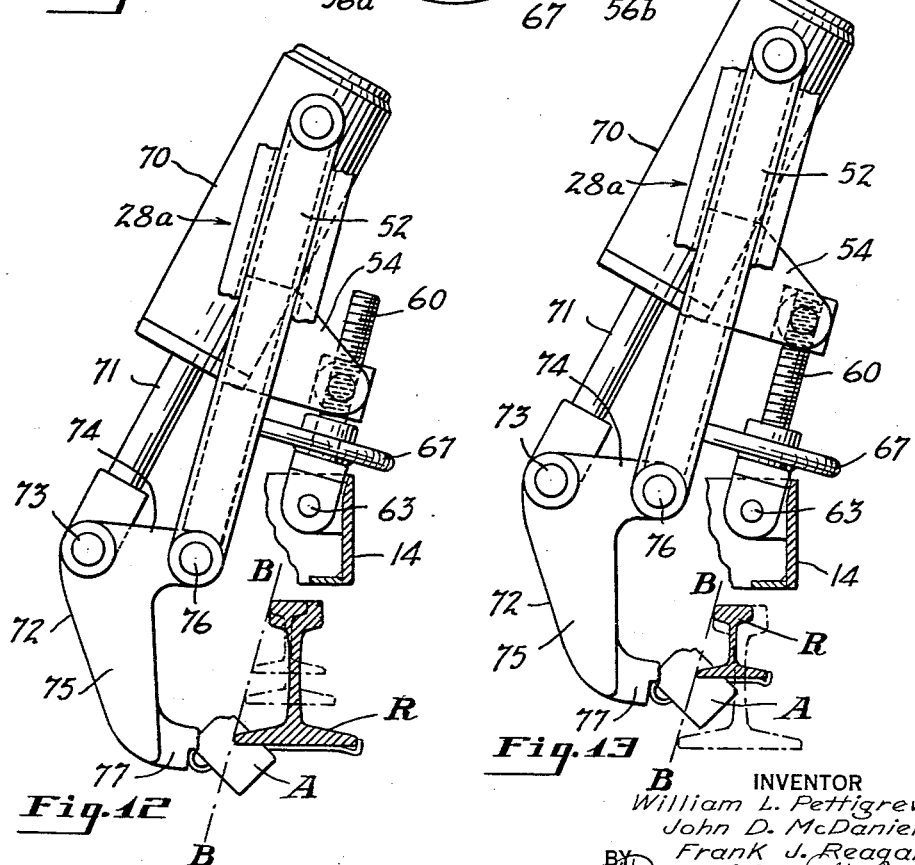

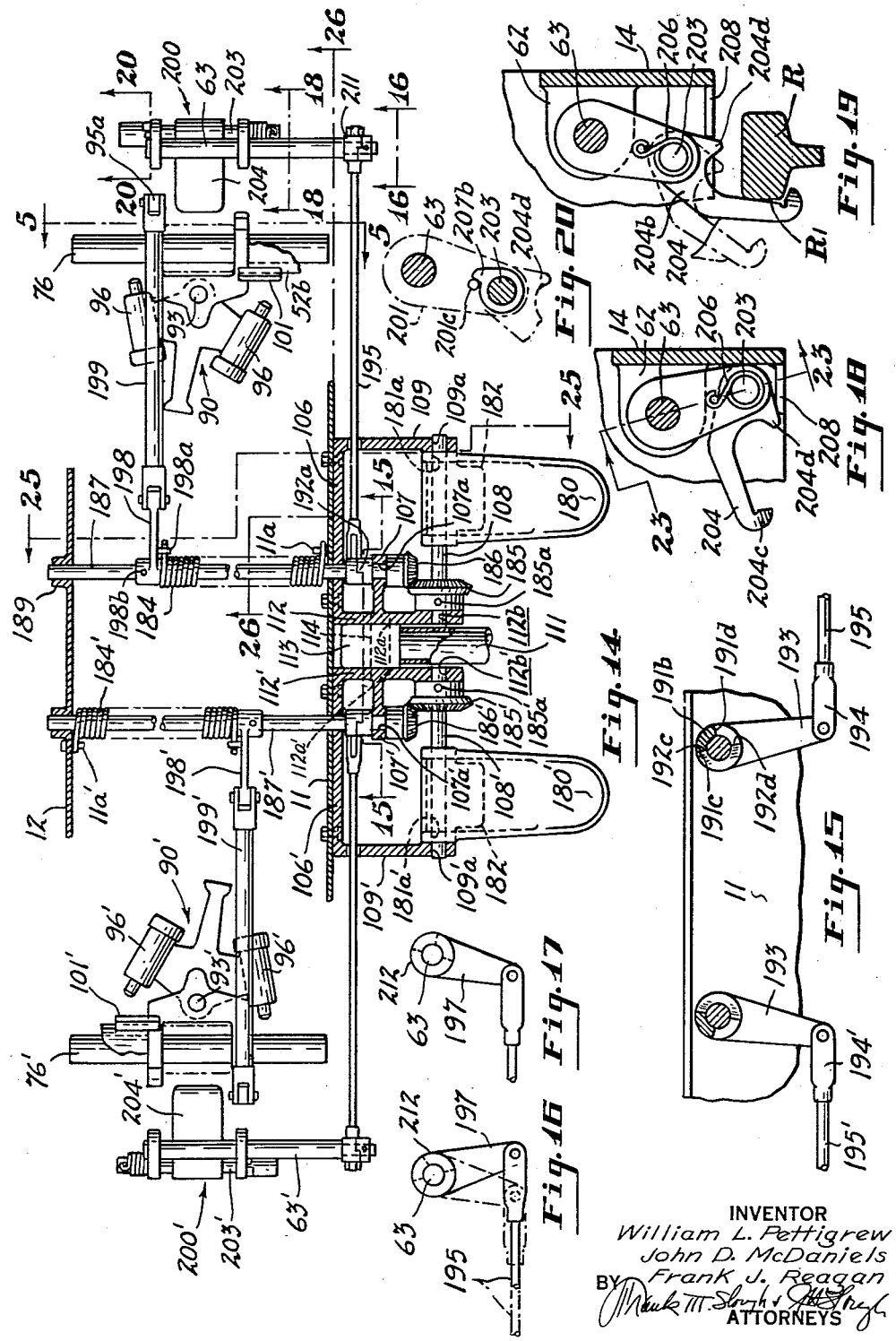

Feb. 4, 1964
W. L. PETTIGREW ETAL
3,120,193
RAIL ANCHOR DRIVING MACHINES
Filed Nov. 29, 1957
10 Sheets-Sheet 7
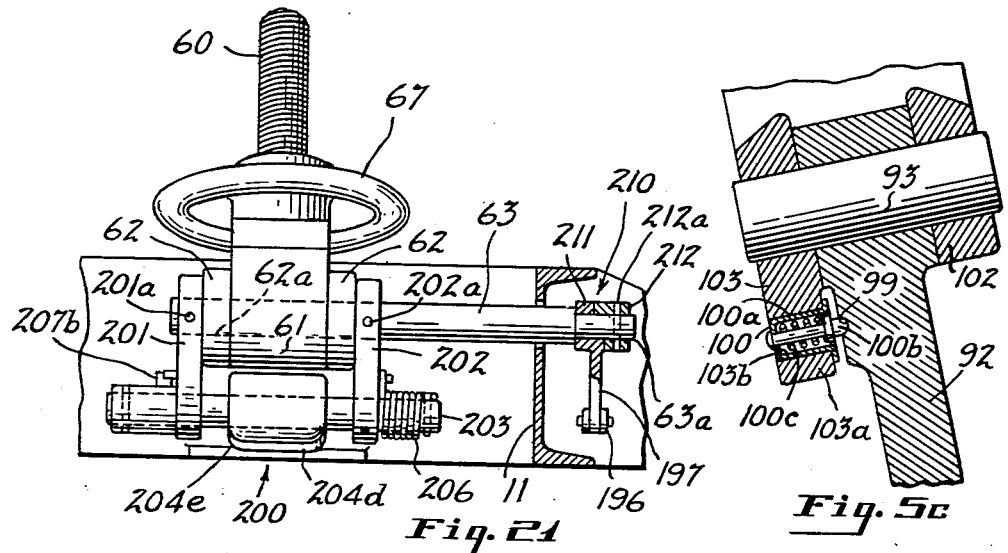
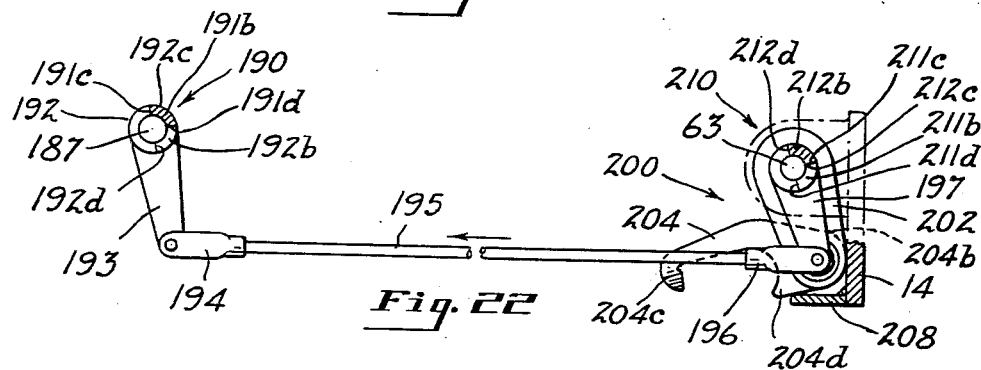
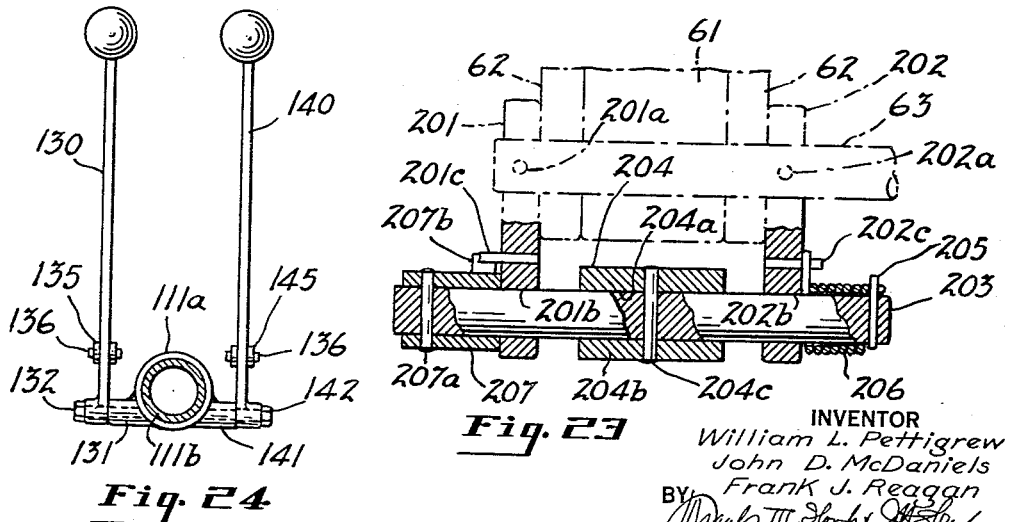
INVENTOR
William L. Pettigrew
John D. McDaniels
Frank J. Reagan
BY
ATTORNEYS

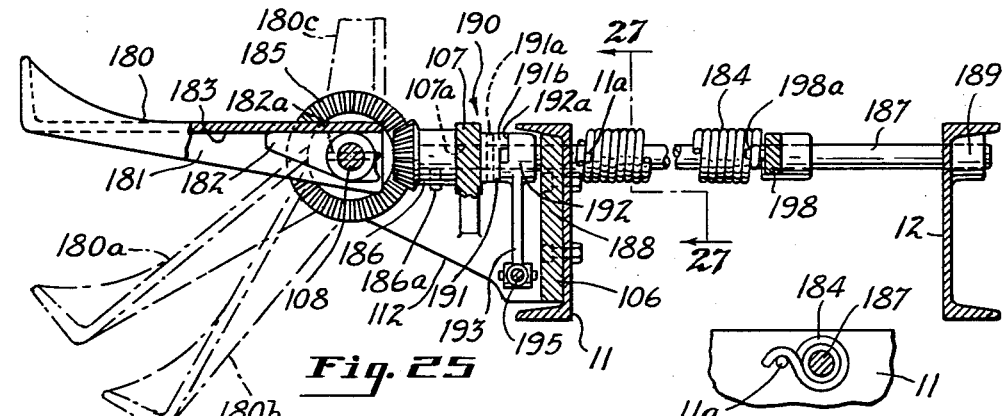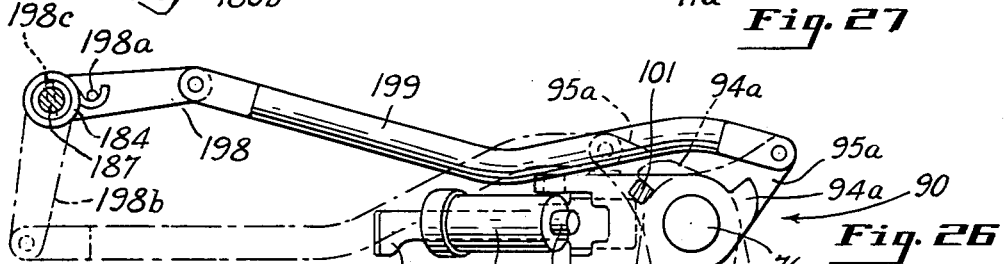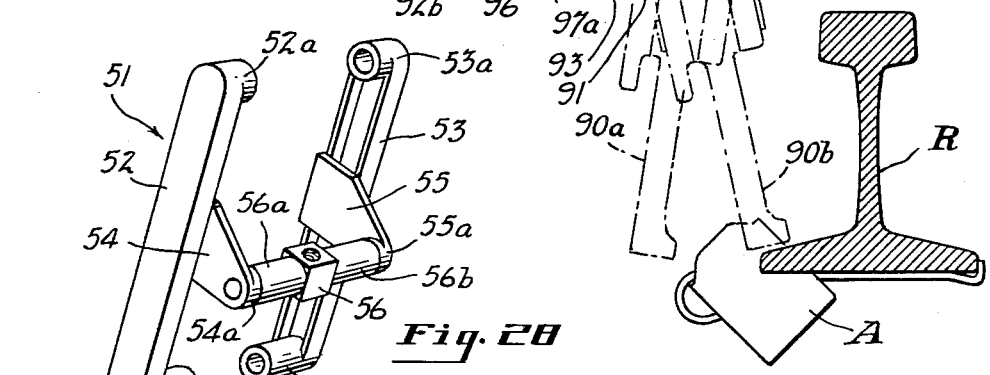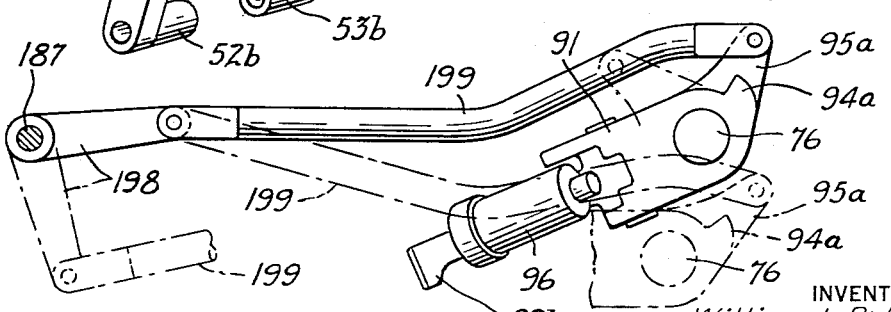

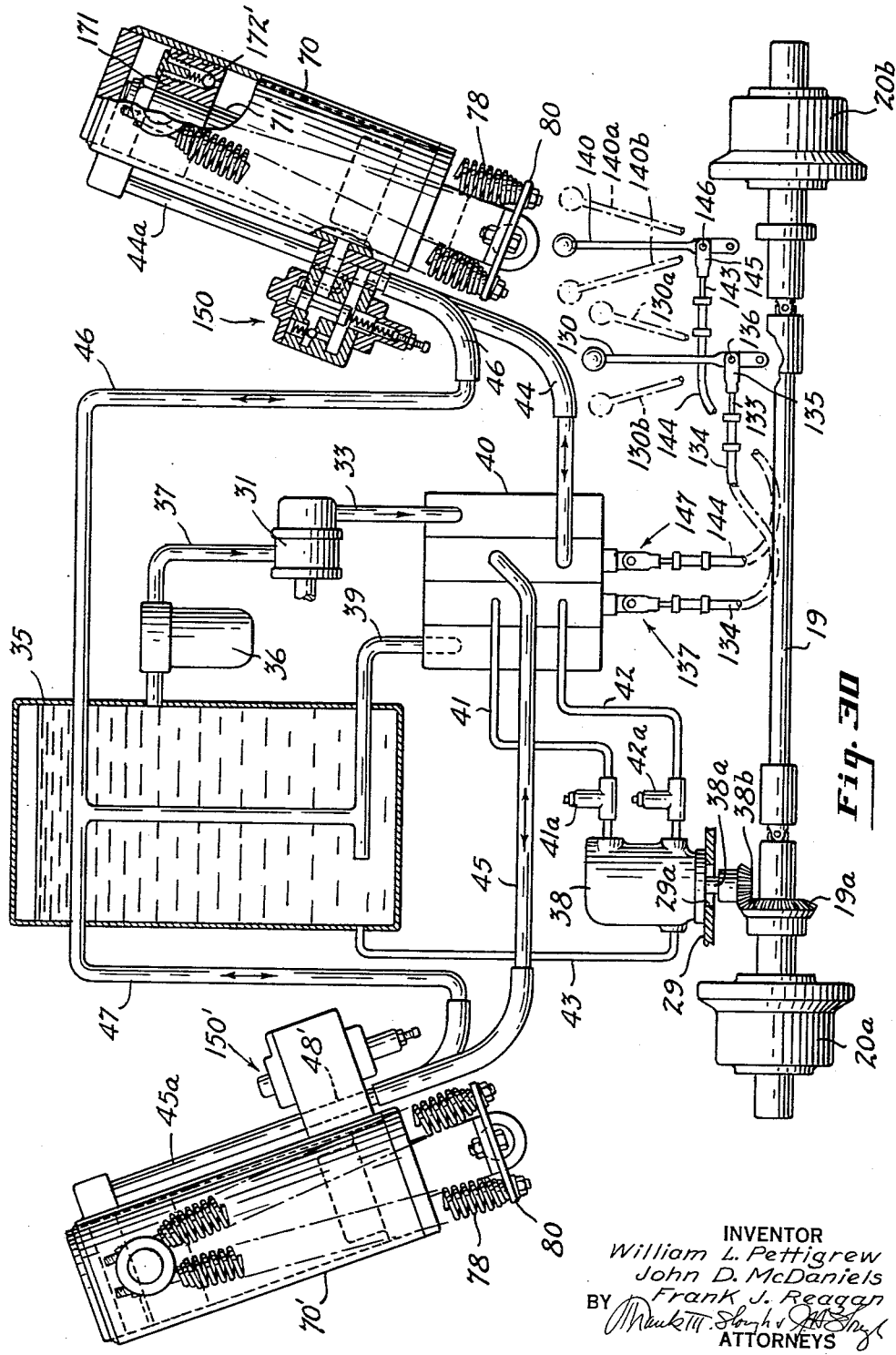

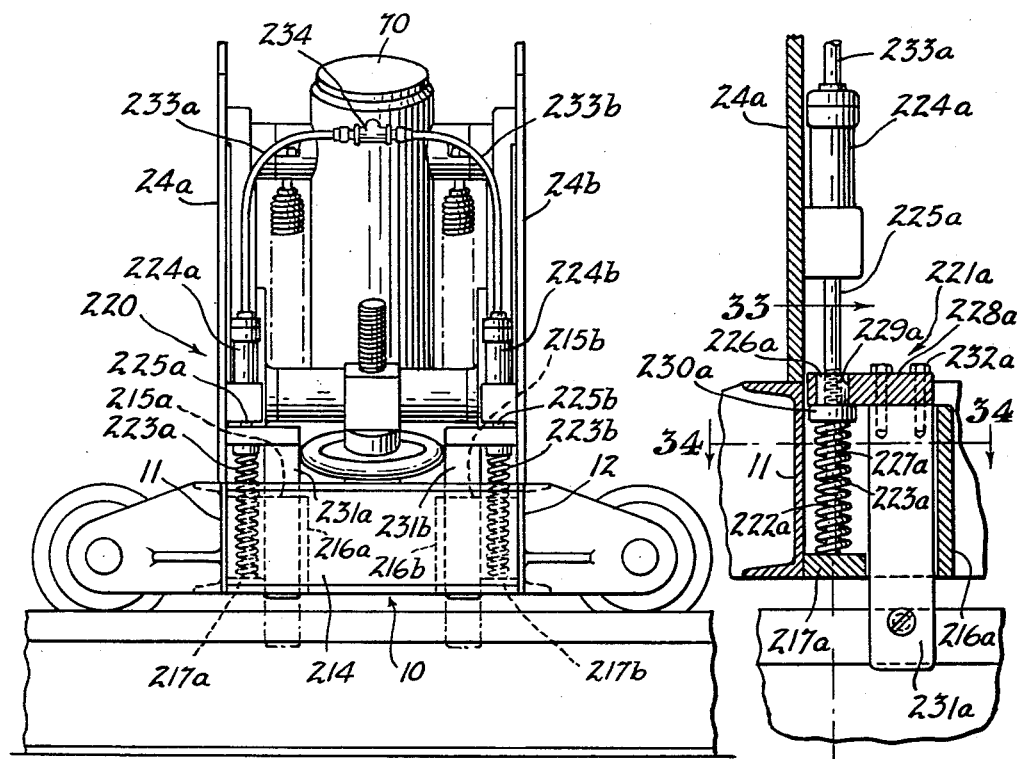
Fig. 31
Fig. 32
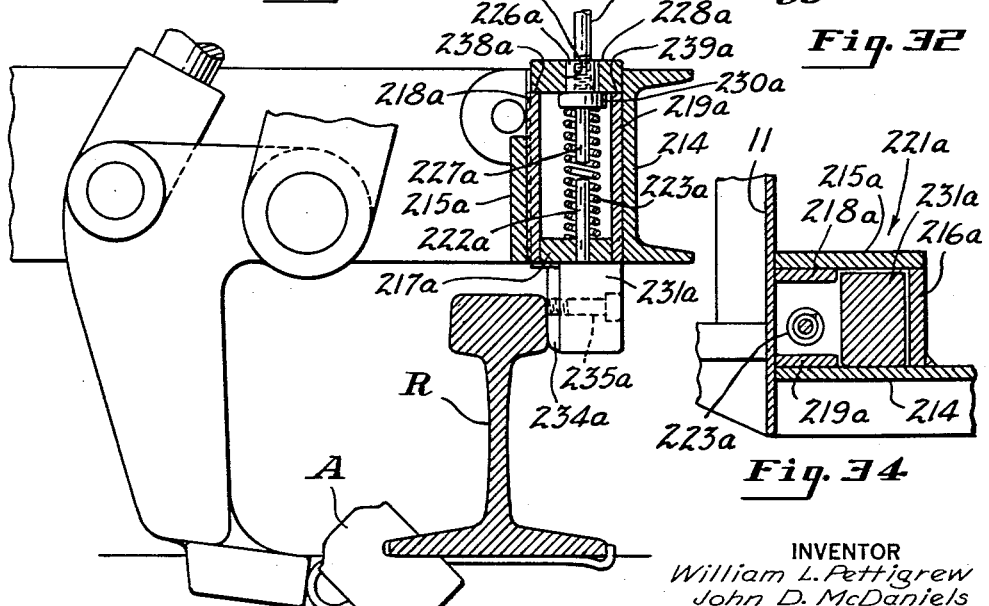
Fig. 33
Fig. 34
INVENTOR
William L. Pettigrew
John D. McDaniels
Frank J. Reagan
BY
ATTORNEYS United States Patent Office 3,120,193
Patented Feb. 4, 1964

3,120,193
RAIL ANCHOR DRIVING MACHINES
William L. Pettigrew, Geneva, Ohio, John D. McDaniels, Lynchburg, Va., and Frank J. Reagan, Battle Creek, Mich., assignors to True Temper Corporation, Cleveland, Ohio, a corporation of Ohio
Filed Nov. 29, 1957, Ser. No. 699,690
17 Claims. (Cl. 104—2)

Our invention relates to a machine for driving rail anchors into interlocking engagement with one rail of a railroad track. More particularly our invention relates to a machine of the aforesaid type which is adapted to travel upon a railroad track under its own power and which provides seating means for the operator.

Rail anchors are ordinarily driven into interlocking engagement with the rail by manual means, such as a blow from a sledge hammer or by leverage applied to the anchor with a suitably adapted hand tool. Such methods are unsatisfactory due to the difficulty in applying a uniform amount of pressure to each individual anchor, to the tendency of the anchor to become misaligned with the rail if the driving pressure is not applied at the correct angle, and to the difficulty in holding the anchor firmly against the tie while driving it. Manual methods of driving rail anchors are also time-consuming and expensive.

The preferred form of our rail anchor driving machine, as it is disclosed herein, comprises a four-wheeled vehicle having a rectangular frame, the wheels of said vehicle being flanged and adapted for rolling engagement with a pair of rails. Mounted upon the frame are a pair of hydraulic cylinders adapted to actuate a pair of pivoted anchor drive arms. Each anchor drive arm is so pivoted relative to the frame as to swing downwardly between the rails to engage the striking portion of a pre-positioned rail anchor, thus driving it into interlocking engagement with the adjacent rail. The hydraulic power system, in the form shown, is also mounted upon the frame and comprises a small gasoline-type engine, a pump operated by the engine and providing fluid pressure, a fluid reservoir, a hydraulic motor suitably geared to provide locomotive power for the anchor driving machine, and a suitable valve for controlling and directing the fluid.

The operator's seat is mounted upon the free end of a forwardly cantilevered boom. Control means for operating the anchor driving machine are provided in the form of forwardly projecting foot pedals and suitable hand levers mounted upon the seat boom.

Other details of the preferred form of our invention will hereinafter be more fully described. The preceding description is intended to convey only the general principles of our rail anchor driving machine and particularly the general principles of the preferred form of our machine as it is herein illustrated and described.

It is an object of our invention to provide a machine of the referred to type which is relatively small and compact and which can travel upon the rails and further be readily transported long distances upon a truck, trailer, or railroad car.

Another object of our invention is to provide a rail anchor driving machine of the above type which is adapted to apply a uniform optimum driving pressure to a pre-positioned rail anchor.

Another object of our invention is to provide a machine as above described which will firmly hold the rail anchor against the contiguous rail tie when said rail anchor is being driven.

Another object of our invention is to provide a machine of the type referred to which machine is so positioned relative to the rail that it engages rail anchors at the proper driving angle prepositioned thereon without further adjustment thereof.

Still another object of our invention is to provide a machine of the aforesaid type which can be self-propelled along a track for the successive driving of different rail anchors.

A further object of our invention is to provide a rail anchor driving machine of the above type which is adapted to drive a rail anchor when approaching said rail anchor from either a forward or rearward direction.

Yet another object of our invention is to provide a machine of the above type which is adapted to automatically drive a rail anchor in response to simple operative adjustments of suitable control means.

Still a further object of our invention is to provide a machine of the type referred to which is adapted for use with different size rails and different type rail anchors.

Yet another object of our invention is to provide in a machine of the type referred to various safety devices.

Still a further object of our invention is to provide a machine of the type referred to which will be relatively simple to manufacture, inexpensive, and highly efficient in use.

Other objects of our invention and the invention itself will be readily understood by a study of the accompanying specification and the appended drawings in which drawings:

FIG. 3 is a front elevational view of our rail anchor driving machine taken along the line 3—3 of FIG. 2 and showing certain parts in section;

FIG. 4 is a side elevational view showing the rail anchor driving machine with the seat portion folded upwardly and out of operating position;

FIG. 4a is a detailed sectional view of the interlocking mechanism of FIG. 4;

FIG. 5 is an elevational view of a positioner device of our rail anchor driving machine taken along the line 5—5 of FIG. 14;

FIG. 5a is a sectional view taken along the line 5a—5a of FIG. 5;

FIG. 5b is a sectional view taken along the line 5b—5b of FIG. 5;

FIG. 5c is a detailed sectional view of the detent mechanism of the positioner device as shown in FIG. 6;

FIG. 6 is a cross-sectional view of the positioner device of FIG. 5 taken along the line 6—6 of FIG. 5;

FIG. 7 is a cross-sectional view of a seat supporting shaft taken along the line 7—7 of FIG. 3;

FIG. 8 is a vertical sectional view taken along the line 8—8 of FIG. 4 and showing one hydraulic cylinder, a rail anchor drive arm, and associated parts;

FIG. 9 is a view taken along the line 9—9 of FIG. 8;

FIG. 10 is a view taken along the line 10—10 of FIG. 8;

FIG. 11 is a view taken along the line 11—11 of FIG. 8;

FIG. 12 is an elevational view of one hydraulic cylinder and associated driving arm in one adjusted position;

FIG. 13 is a view showing the hydraulic cylinder and associated driving arm in another adjusted position;

FIG. 14 is a top plane view of the control linkage and associated parts of our rail anchor driving machine;

FIG. 15 is a view taken along the line 15—15 of FIG. 14;

FIG. 16 is a view taken along the line 16—16 of FIG. 14;

FIG. 17 is a view showing the linkage of FIG. 16 in another operative position;

FIG. 18 is a view taken along the line 18—18 of FIG. 14 showing a rail hooking device of our rail anchor driving machine, said hooking device being shown in a nonoperative position;

FIG. 19 is a view similar to FIG. 18 showing the rail hooking device in an operative position;

FIG. 20 is a view taken along the line 20—20 of FIG. 14;

FIG. 21 is a view of a rail hook of my anchor driving machine taken along the line 21—21 of FIG. 2;

FIG. 22 is a sectional view combining elements of FIGS. 15, 16 and 18 and showing the operative relationship thereof;

FIG. 23 is a sectional view taken along the line 23—23 of FIG. 18;

FIG. 24 is a sectional view taken along the line 24—24 of FIG. 1;

FIG. 25 is a view of one of the control pedals and associated parts of my rail anchor driving machine, said view taken along the line 25—25 of FIG. 14;

FIG. 26 is a view taken along the line 26—26 of FIG. 14 showing the positioner device and its associated parts in an "up" position;

FIG. 27 is a cross-sectional view taken along the line 27—27 of FIG. 25;

FIG. 28 is a perspective view of one of the trunnion mounts of our anchor driving machine;

FIG. 29 is a view similar to FIG. 26 showing the positioner device in a different adjusted position;

FIG. 30 is a diagrammatic view of the hydraulic control and driving system of our rail anchor driving machine;

FIG. 31 is a side elevational view similar to FIG. 4 showing a modification of our rail anchor driving machine;

FIG. 32 is an enlarged, detailed, sectional view of a rail blocking device shown generally in FIG. 31;

FIG. 33 is a view taken along the line 33—33 of FIG. 32; and

FIG. 34 is a view taken along the line 34—34 of FIG. 32.

Figure 1:
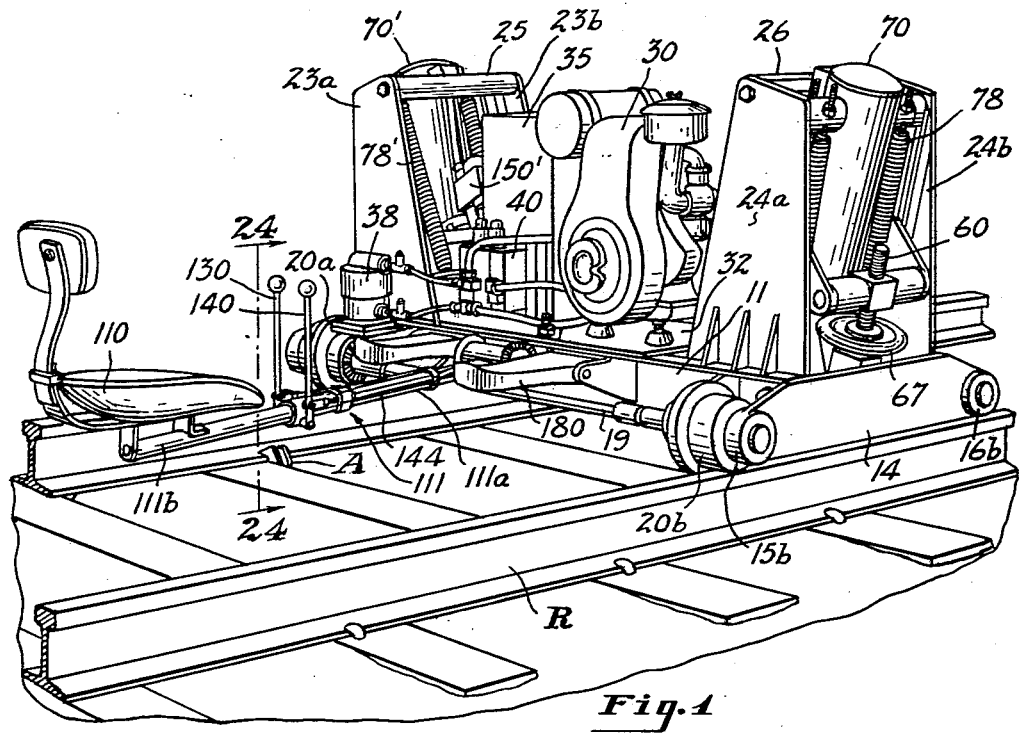
FIG. 1 is a perspective view of the rail anchor driving machine of our invention, said machine being shown positioned upon a railroad track in preparation for driving rail anchors.
Figure 2:
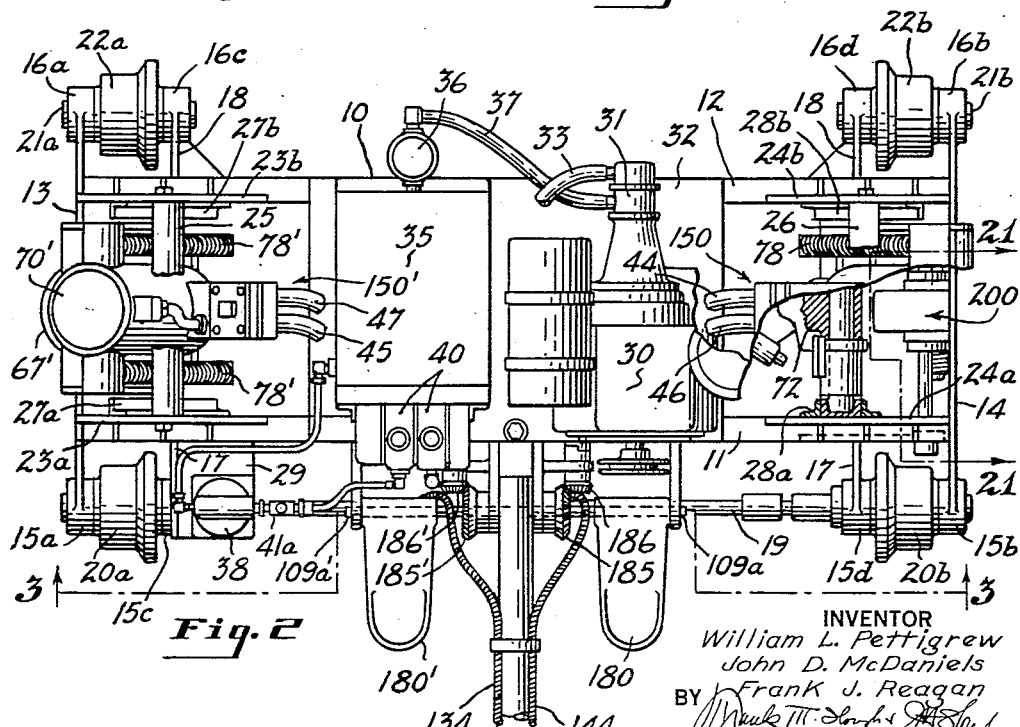
FIG. 2 is a top plan view of the rail anchor driving machine of FIG. 1.

Referring now to the drawings and referring more particularly to FIGS. 1, 2, and 3 in which we show generally overall views of the rail anchor driving machine of our invention, at 10 we show the main frame upon which my machine is mounted. The frame 10 is generally rectangular in shape and comprises two parallel interspaced, channel-shaped beams, a forwardly disposed beam 11 and a rearwardly disposed beam 12, the channel-shaped beams 11 and 12 being integrally joined at the laterally disposed ends thereof by means of side plates 13 and 14 of substantially heavy metal. The said side plates are welded or otherwise suitably secured to the said beams. The side plates 13 and 14 extend forwardly and rearwardly beyond the beams 11 and 12 respectively and are provided with bearings 15a, 15b, 16a and 16b, the bearings 15a and 15b being welded or otherwise suitably united with the forwardly protruding ends of the side plates 13 and 14, and the bearings 16a and 16b being similarly secured to the rearwardly protruding ends of said side plates.

The bearings 15a, 15b, 16a and 16b have transverse horizontal axes which are parallel with the beams 11 and 12 and are provided with complementary bearings 15c, 15d, 16c and 16d respectively, said bearings 15c, 15d, 16c and 16d being spaced laterally inwardly from and coaxial with said bearings 15a, 15b, 16a and 16b. The bearings 15c and 15d are mounted upon the forwardly disposed surface of the forward beam 11 by means of brackets 17 welded or otherwise suitably secured thereto, and the bearings 16c and 16d are mounted upon the rearwardly disposed surface of the rearmost beam 12 by means of similarly secured brackets 18.

A front axle 19 is journalled within the bearings 15a, 15b, 15c, and 15d. Two forwardly disposed flanged rail-type wheels 20a and 20b are mounted upon the axle 19; the wheel 20a is interposed between the bearings 15a and 15c and the wheel 20b is interposed between the bearings 15b and 15d.

Rear axles 21a and 21b are journalled within the rearwardly disposed bearings 16a, 16b, 16c, and 16d. Upon the rear axle 21a there is rotationally mounted a flanged rail-type wheel 22a, said wheel being interposed between the bearings 16a and 16c, and in a similar manner a flanged, rail-type wheel 22b is mounted upon the axle 21b between the bearings 16b and 16d.

It will be understood from the foregoing description and the accompanying drawings that the beams 11 and 12 of the frame 10 are disposed at right angles relative to the direction of travel of our rail anchor driving machine, and in the form shown, the distance between said beams is preferably substantially less than the length thereof. The forwardly disposed beam 11 and the rearwardly disposed beam 12 are further structurally united by means of a preferably horizontally disposed rectangular mounting plate 32, two forwardly and rearwardly disposed parallel edges of said mounting plate being welded or otherwise suitably secured to the uppermost surfaces of said beams. The mounting plate 32 is centrally located relative to the laterally disposed side plates 13 and 14, the laterally disposed edges of said mounting plate being interspaced a substantial distance from said side plates.

The mounting plate 32 (FIG. 2) serves as supporting means for the various components of the hydraulic power system of our rail anchor driving machine, said system preferably comprising a small gasoline engine 30 which mechanically drives a pump 31, a fluid reservoir 35, a hydraulic motor 38, and a four-way valve 40.

On either side of the mounting plate 32, the frame 10 is provided with a pair of laterally directed, vertically upstanding, interspaced parallel support members 23a—23b and 24a—24b. The support members 23a and 23b are positioned upon the uppermost surface of the beams 11 and 12 respectively adjacent the side plate 13, and the support members 24a and 24b are positioned upon the beams 11 and 12 respectively adjacent the side plate 14 in a substantially similar manner. The support members 23a, 23b, 24a, and 24b are preferably welded to the beams 11 and 12 at the lower edges of said support members. The vertically uppermost ends of the pairs of support members, 23a—24b and 24a—24b, are connectively reinforced and held in parallel spaced relationship by means of distance-rods 25 and 26 respectively.

Referring now particularly to FIGS. 2, 4 and 11, the support members 23a, 23b, 24a, and 24b are provided with slideways 27a, 27b, 28a and 28b respectively. The slideways 27a and 27b are mounted upon the inner opposing side surfaces of the support members 23a and 23b respectively and the slideways 28a and 28b are mounted upon the opposing side surfaces of the support members 24a and 24b. The following description of the pairs of support members 23a—23b and 24a—24b is directed primarily at the support members 24a and 24b and the parts associated therewith, it being understood that the support members 23a and 23b and associated parts are substantially reverse images of said support members 24a and 24b throughout all corresponding parts. With the exception of those parts which have been herein already recited and numbered, the numbers designating the parts associated with the support members 24a and 24b will be understood to apply also to the corresponding reverse image parts associated with the support members 23a and 23b, said numbers of said reverse image parts being primed to differentiate them.

Referring now particularly to FIGS. 4 and 11, the slideway 28a comprises two cross-sectionally angle-shaped side members 50a and 50b welded or otherwise suitably attached to the inner surface of the support member 24a, said side members being parallel and so positioned as to provide an obliquely directed guide throughout a substantial portion of the vertical dimension of said support member. The slideway 28b is complementarily positioned upon the opposing inner side surface of the support member 24b and comprises two cross-sectionally angle-shaped side members 51a and 51b. The slideway 27a, 27b, 28a, and 28b provide downwardly directed channels on the inner opposing surfaces of the support members 23a, 23b, 24a, and 24b respectively with the lowermost ends of said slideways positioned slightly inwardly in the direction of the mounting plate 32 of the frame 10.

The slideways 28a—28b provide means for guiding an adjustable trunnion mount 51 (FIG. 28), said trunnion mount providing mounting means for a trunnioned cylinder 70.

In FIG. 28 we show a detailed view of the trunnion mount 51 which comprises two laterally spaced, parallel, channel-shaped slide members 52 and 53, said slide members being of such size and dimension as to slidably interfit the slideways 28a and 28b of the forwardly disposed support member 24a and the rearwardly disposed support members 24b respectively. The slide members 52 and 53 are provided with laterally outwardly projecting arms 54 and 55 respectively, said arms being welded or otherwise integrally secured to said slide members at the generally medial portions thereof and having axially aligned bearings 54a and 55a at the laterally extending ends thereof. An internally threaded adjusting pivot block 56 having trunnions 56a and 56b is journaled within bearings 54a and 55a. The slide members 52 and 53 have axially aligned bearings 52a and 53a respectively which are welded or otherwise integrally secured to the uppermost ends of said slide members and axially aligned bearings 52b and 53b similarly secured to the lowermost ends thereof.

The trunnion mount 51 is slideably adjustable relative to the slideways 28a and 28b by means of a pivoted adjusting screw 60 (FIGS. 4 and 8) rotatably mounted at one non-threaded end 60a thereof within a bore 61a of the non-pivoted end of a short pivot arm 61. The said pivot arm 61 is mounted for pivotal movement upon the inner surface of the side plate 14 by means of interspaced, parallel brackets 62. A pivot shaft 63 is projected through aligned bearing apertures 62a (FIG. 21) in the brackets 62 and said pivot shaft 63 is axially parallel with the side plate 14. The screw 60, is, therefore, axially at right angles relative to the axis of said pivot shaft.

The non-threaded end 60a of the screw 60 is retained within the bore 61a in the nonpivoted end of the pivot arm 61 by means of a pivot arm cap 64 preferably bolted to the end of said pivot arm by means of bolts 65. The cap 64 is apertured at 64a, said aperture being axially aligned with and of the same diametric dimension as the bore 61a. The lower surface of the cap 64 is provided with a shallow, concentric recess 64b. A snap ring 66 positioned within a circumferential groove 60b of the non-threaded end 60a is adapted to be rotatably contained within the recess 64b thereby retaining said screw against axially longitudinal movement.

Rotational movement of the screw 60 is facilitated by means of a hand wheel 67 which is secured to the screw 60 by means of a set screw 67a. The threaded portion of the screw 60 is positioned within the internally complementarily threaded adjusting pivot block 56 of the trunnion mount 51. By rotation of the hand wheel 67 and adjusting screw 60, the adjusting pivot 56 and the trunnion mount 51 are adjusted obliquely either upwardly and outwardly or downwardly and inwardly.

The cylinder 70 is mounted upon the trunnion mount 51 by means of trunnions 70a and 70b of said cylinder being pivotally journaled with the bearings 52a and 53a of said trunnion mount (FIG. 4). The trunnions 70a and 70b of the cylinder 70 are positioned adjacent the closed, uppermost end of said cylinder and said cylinder hangs generally downwardly therefrom between the slide members 52 and 53.

A cylinder piston rod 71 projects downwardly from the lower end of the cylinder 70 and is pivotally connected at its lowermost end to a rail anchor driver 72 (FIGS. 8, 12, and 13). The driver 72 is a bell crank lever formed of a heavy metal casting, said lever being pivoted to the piston rod 71 at a relatively medial pivot by a shaft 73 and having two arms radially projecting therefrom, a short, laterally outwardly projecting pivot arm 74 and a relatively longer driving arm 75. A laterally outwardly projecting end of the pivot arm 74 of the driver 72 is pivoted on the shaft 76 mounted on lower bearings 52b and 53b of the trunnion mount 51. In the position of the drive shown in FIGS. 12 and 13, the pivot arm 74 projects in an outward direction from the central portion of the rail anchor driving machine, and the driving arm 75 has an outwardly directed foot portion 77 at its lowermost end, said foot portion being adapted to contact the driving portion of a rail anchor, as hereinafter described.

Referring now to FIGS. 3, 8, 12, and 13, the pivotal operation of the rail anchor driver 72 will be understood to be as follows. The cylinder 70 is adapted to actuate the piston rod 71 by means to be herein later more fully described. The stroke of the piston rod 71, by means of the medial pivot shaft 73 of the driver 72, rotates said driver from the uppermost full-line position of FIG. 8 to the lowermost dotted position thereof. The foot portion 77 of the driver 72 follows an arcuate downward and outward path as said driver pivots around the shaft 76. In the uppermost position, the foot portion 77 is positioned between the beams 11 and 12 of the frame 10, and in the lowermost position, said foot portion is positioned adjacent the inside of the one of the track rails which is indicated by the letter "R." A rail anchor A, prepositioned on the rail R, is driven into interlocking engagement with said rail by the foot portion 77 of the driver 72.

In FIGS. 12 and 13, we illustrate two adjusted positions of the rail anchor driver 72 and its associated parts. Rails vary as to their cross-sectional dimensions, and the rail anchor driver is, therefore, preferably adjustable to all sizes. The vertical and lateral dimensions of various size rail anchors decrease or increase in a substantially proportionate manner, and the inside edges of the different rail bases as seen in cross-section, are disposed in substantially similar angular relationships relative to the inside edges of the supporting portions of said rails. In FIGS. 12 and 13, the above described angular relationship is shown by the broken line B—B. The angle of the line B—B is substantially parallel with the obliquity of the trunnion mount 51. When the trunnion mount 51 is raised or lowered by means of the hand wheel 67 and the screw 60, the relationship of the cylinder and the driver to said trunnion mount is not affected.

The cylinder 70 is hydraulically operated, from a source of hydraulic power hereinafter described, to propel the piston rod 71 in a downward direction to actuate the driver 72 and, thereby drive the rail anchor A. The piston rod 71 is returned to a retracted or uppermost position (FIG. 8, full line position) preferably by means of externally mounted springs 78, there being, in the form shown, four of said springs.

Referring now to FIGS. 4, 8, 10, and 30, the lowermost ends of the springs 78 are mounted upon a generally inverted U-shaped bracket 79 carried by the piston rod 71. The piston rod 71 has a circumferentially reduced, externally threaded portion 71a at the lowermost end thereof which projects downwardly through a suitable aperture 79a in a horizontally disposed mounting portion 79b of the bracket 79. The mounting portion 79b of the bracket 79 is provided with two integrally formed, downwardly extending bracket arms 79c on either side of the piston rod 71, said bracket arms having horizontally outwardly projecting lugs 79d. The bracket arms 79c and the lugs 79d project outwardly beyond the outer periphery of the cylinder 70 and are in an aligned direction parallel with the trunnions 70a and 70b of said cylinder. Each of the lugs 79d provides mounting means for spring return yoke 80. Each of the yokes 80 is secured to the lower surfaces of the lugs 79d preferably by means of bolts 80a, said yokes being at right angles to the axis of the trunnions 70a and 70b, and the protruding ends of said yokes providing attaching means for the lower ends of the springs 78.

The springs 78 are preferably helical type springs with coned ends, said springs being attached at the lowermost end thereof to one end of one of the yokes 80 in a well-known manner by means of swivel bolts 81, and being similarly attached at the uppermost end thereof to one of the trunnions 70a or 70b by swivel bolts 82.

The reduced, threaded end portion 71a of the piston rod 71 is provided with a clevis 71b (FIG. 10) said clevis being screw-thread fitted to said end portion. The clevis 71b serves as retaining means for the bracket 79 and is provided with a bore through which the medial pivot shaft 73 of the driver 72 is projected and about which it pivots.

In FIG. 5, we show a rail anchor driving machine positioner device 90 which is pivotally mounted upon the shaft 76. When in an operative position, the positioner device 90 is adapted to project downwardly beneath the anchor driving machine whereby it contacts a prepositioned rail anchor thus halting the forward motion of said machine. The positioner device has two purposes: it stops the anchor driving machine at the exact position necessary for driving said anchor and it serves as shock-absorbing means when said machine is halted. The positioner device 90 has attached thereto suitable control linkage whereby said positioner can be pivoted downwardly between the rails into the path of a prepositioned rail anchor or pivoted upwardly whereby it will not contact said anchor. The above referred to control linkage is manipulated by the operator of the anchor driving machine and will herein later be fully described.

The positioner 90 comprises, as best shown in FIG. 5, a yoke having a pair of upwardly extending generally parallel spaced arms 94 and 95, a pair of downwardly extending generally parallel spaced arms 102 and 103, the arms 94 and 95 have aligned apertures through which the shaft 76 projects. The arms 102 and 103 are also provided with aligned apertures. The arms 94, 95 are disposed, in the form shown, at a 90° angle to the arms 102 and 103 respectively; and the recited arm 74 of the driver 72 is pivotally mounted upon the shaft 76 between said pivot arms 94 and 95. The positioner arm 103 is provided medially with an ear 103a within which a detent is provided for use as hereinafter described. The positioner 90 also comprises a pendant leg 92 mounted by means of a lug 92a thereof upon a pin 93 projected through the apertures of the arms 102 and 103.

The positioner leg 92, as seen in FIG. 5, has a downwardly extending striking foot 92b which projects into the path of a prepositioned rail anchor A when in a downward position, and two oppositely directed wing portions 92c and 92d. The wings 92c and 92d are aligned in a direction parallel with the shaft 76 and the bearings 52b and 53b of the trunnion mount 51.

Two substantially identical shock absorbers 96 are welded or otherwise suitably secured to the oppositely disposed edges of the wings 92c and 92d. The axes of the shock absorbers 96 symmetrically converge in a downward direction relative to a center line of the striker 92b. When the positioner leg 92 is pivoted a sufficient distance in either a clockwise or counterclockwise direction, one of the shock absorbers 96 contacts the outer peripheral surface of one of the bearings 52b or 53b.

In FIG. 5a we show a detailed cross-sectional view of one of the shock absorbers 96. The shock absorber 96 has a cylindrical housing 96a preferably manufactured of steel or a similar material, said housing having a cap 96b screw-thread fitted upon one end thereof and having an integrally formed wall 96d in the other end thereof. The cap 96b has a central perforation 96c and the end wall 96d has a relatively larger central perforation 96e. The perforations 96c and 96e are axially aligned and provide guide means for a plunger 97. The plunger 97 is of such diameter as to slidably interfit the perforation 96c in the cap 96b and is provided with a diametrically enlarged head portion 97a of such diameter as to slidably interfit the relatively larger perforation 96e in the end wall 96d. The plunger 97 is also provided with a circumferentially continuous, outwardly projecting flange 97b, said flange being spaced longitudinally a short distance from said head portion 97a. A heavy, tensioned, coil spring 98 is interposed between the cap 96b and the circumferential flange 97b, said spring biasing the plunger 97 in the direction of the end wall 96d. When thus assembled, the head portion 97a of the plunger 97 projects outwardly from the cylinder housing 96a through the perforation 96e in the wall 96d.

The shock absorbers 96 are positioned upon the positioner leg 92 with the projecting head portion 97a of the plungers 97 directed toward the bearings 52b and 53b. A pivotal movement of the positioner leg 92 brings one of the heads 97a of the shock absorbers 96 into contact with one of the bearings 52b or 53b. If the force of such contract is substantial, the head portion 97a and the plunger 97 retracts against the spring 99 thus absorbing the shock.

Referring again to FIG. 5, it will be noted that the positioner leg 92 has two extreme positions, one shown in full line and one shown in broken line. To hold the positioner arm in either of the two extreme positions as illustrated, we provide a simple-spring-biased detent mechanism 100 adapted to engage either of two complementarily formed recesses 99 in the positioner leg 92.

The medially disposed ear 103a of the wall portion 103 extends in the same plane as said wall portion and serves as mounting means for the detent mechanism 100 (FIG. 5c). The detent mechanism 100 is of a well known type comprising a cylindrical housing 100a fitted into a suitable aperture 103b of the ear 103a and having a slidably fitting detent 100b projecting outwardly therefrom in the direction of the positioner leg 92, said detent being outwardly biased by means of a coil spring 100c. The positioner leg 92 is provided with two recesses or indentations 99 in the surface adjacent said ear, said indentations being adapted to interfit the outermost preferably concave end of the detent 100b. The indentations 99 are so positioned as to frictionally hold the positioner leg 92 in either of its extreme clockwise or counterclockwise positions. The frictional holding force of the detent mechanism 100 is relatively slight and does not interfere with the reverse movement of the positioner arms.

The lowermost pivotal movement of the positioner leg 92 on the shaft 76 is limited by means of a stop 101 (FIG. 5b). The stop 101 is in the form of a preferably rectangular bar welded or otherwise suitably secured to the outer peripherial surface of the bearing 52b. The stop 101 is longitudinally positioned upon the bearing 52b and a portion of said stop projects over the arm 94 of the positioner head 91 (FIG. 5). The arm 94 is provided with a radially outwardly projecting lug 94a which abuts the stop 101 when the positioner arm 92 is rotated to an optimum lowermost position.

The pivot arm 95 is provided with a radially outwardly projecting lug 95a to which the control linkage for pivoting the positioner head is attached, said control linkage to be herein later more fully described.

It will be understood that, as above described, the positioner device 90 is obliquely adjustable with the rail anchor driver 72, said positioner device and said anchor driver both being mounted upon the shaft 76. When the rail anchor driver 72 is adjusted to the different rail sizes as shown in FIGS. 12 and 13, the positioner device 90 is automatically adjusted, as shown in FIG. 29, and the cooperative relationship between said anchor driver and said positioner is, therefore, constantly maintained throughout all adjusted positions.

The operator of the rail anchor driving machine is provided with a seat 110 which is secured to a cantilevered boom 111 (FIG. 1). The boom 111 is of heavy tubular construction and is pivotally secured to the forwardly disposed beam 11 of the frame 10 and projects forwardly therefrom. The seat 110 is rigidly secured to the forwardly projecting end of the boom 111, and the operator, when seated upon said seat, faces the front of the anchor driving machine.

Referring now to FIGS. 1, 2 and 14, the boom 111 is pivoted to the frame 10 by means of two laterally interspaced, parallel brackets 112 and 112' which are symmetrically spaced relative to the medial point of the beam 11, and a pivot portion 113 of the boom is interposed between said brackets. A short pivot shaft 114 projects through axially aligned apertures 112a and 112a' in the brackets 112 and 112' respectively, said pivot shaft also projecting through a suitable aperture 113a in the pivot portion 113.

The pivot portion 113 of the boom 111 (FIG. 7) is preferably in the form of a rectangular block of steel having a longitudinally projecting cylindrical portion 113a over which said tubular boom is telescoped, said boom and said pivot portion being welded or otherwise suitably secured to each other. The pivot shaft 114 projects through the pivot portion 113 a substantial distance forwardly of the rearmost end of said pivot portion. The channel-shaped, forwardly disposed beam 11 has forwardly projecting flanges 11a integrally fromed at the upper and lower edges thereof, and the rearmost end of the boom pivot 113 extends beneath the uppermost flange 11a upon which the forwardly disposed edge of the mounting plate 32 is positioned. An adjustment screw 115 is screw-thread fitted through said upper flange 11a of the beam 11 and the mounting plate 32 above the pivot portion 113 whereby the boom 111 can be angularly adjusted when in its downward or operating position. By means of the pivot shaft 114, the boom 111 and the seat 110 can be pivoted upwardly whereby said boom is in a vertical position (FIG. 4).

As best shown in FIGS. 1 and 4, the boom 111 comprises two telescopically and slidably interfitting tubular portions, a rearwardly disposed, diametrically larger pivot tube 111a and a forwardly disposed, diametrically smaller seat mounting tube 111b upon which the seat 110 is rigidly secured. The pivot tube 111a is pivoted by means of the pivot portion 113 upon the pivot shaft 114. The seat 110 is adjustable relative to the frame 10 of the anchor driving machine by sliding the seat mounting tube 111b forwardly or rearwardly within the pivot tube 111a.

In FIG. 4a we show a detailed sectional view of an interlocking mechanism 117 by which the pivot tube 111a and the mounting tube 111b can be locked in any one of a plurality of longitudinally adjusted, telescopically interfitting positions.

The interlocking mechanism 117 preferably comprises a relatively small tubular housing 117a welded or otherwise suitably secured to the outer surface of the pivot tube 111a and a spring biased latch bolt 119 concentrically mounted within said housing. The housing 117a is axially disposed at right angles to the axis of the pivot tube 111a whereby the latch bolt 119 extends inwardly into said pivot tube through a suitably aligned aperture 111c. The latch bolt 119 is provided with an outwardly projecting grip portion 119a diametrically larger than the housing 117a whereby said latch bolt is manually operable. The housing 117a is provided with a circumferentially continuous groove 117b in the inner concave surface thereof, said groove being near the outermost end of said housing, and a snap ring 118 is positioned within said groove. A snap ring 120 is positioned within a circumferentially continuous groove 119b in the latch bolt 119 adjacent the inwardly disposed end thereof, and a coil spring 121 is interposed between said snap rings whereby said latch bolt is inwardly biased.

The telescopically interfitting mounting tube 111b is provided with a plurality of longitudinally aligned apertures 111d adapted to interlockingly engage the latch bolt 119. By means of the knurled grip portion 119a, the latch bolt 119 can be withdrawn from engagement with one of the apertures 111d of the mounting tube 111b whereby said mounting tube can be moved to another adjusted position.

The controls for operating my rail anchor driving machine comprise a pair of hand-operated levers 130 and 140 mounted upon the boom 111 and a pair of foot-operated pedals 180 and 180'.

The hand levers 130 and 140 are connected to, and serve as operating means for, the four-way valve 40 which is mounted upon the central mounting plate 32 of the frame 10. Referring particularly to FIGS. 1 and 24, the levers 130 and 140 are pivotally mounted upon the pivot tube 111a adjacent the forwardly disposed end of said pivot tube by means of two laterally projecting, integrally secured bosses 131 and 141. The lowermost ends of the levers 130 and 140 are pivoted to the bosses 131 and 141 respectively by means of headed bolts 132 and 142 laterally projecting from said bosses. Control means between the levers 130 and 140 and the four-way valve 40 comprise conventional Bowden type cables 133 and 143 (FIG. 30) slidably disposed within cable housings 134 and 144 respectively. The cable 133 is pivotally mounted to the lever 130 above the lowermost pivot of said levers, by means of a bifurcated link 135 integrally secured to one end of said cable and a pin 136 projecting through said link and said lever, and the cable 143 is similarly secured to the lever 140 by means of a link 145 and a pin 146.

The cable housings 134 and 144 extend from the control levers 130 and 140 to the four-way valve 40 to which said cable housings are attached at 137 and 147 respectively. The control cables 133 and 143 slidably reciprocate within the housings 134 and 144 respectively in response to pivotal motion of the hand levers 130 and 140 thereby operating the four-way valve 40.

Referring now to FIGS. 2 and 3, it will be noted that the hydraulic motor 38 is mounted upon a motor mounting plate 29 projecting forwardly from the forwardly disposed beam 11 of the frame 10 above the forward axle 19. The hydraulic motor mounting plate 29 is welded or otherwise suitably secured to the beam 11 along the rearwardly disposed edge of said mounting plate and to the forward bearing bracket 17 of the wheel bearing 15c at the laterally outwardly disposed edge thereof. The drive shaft of the hydraulic motor 38 projects vertically downwardly through a suitable aperture 29a in the mounting plate 29 and is provided at the downwardly directed end thereof with a beveled drive gear 38b. The axle 19 has concentrically mounted thereupon a complementary driven beveled gear 19a which intermeshes the drive gear 38b of the hydraulic motor 38 whereby the rail anchor driving machine is propelled along the rails.

The hydraulic motor 38 is preferably of a well-known type which is operated by means of fluid under pressure passing therethrough and which is reversibly operable by reversing the flow of said fluid. Referring particularly to FIG. 30 in which we show a diagrammatic view of the hydraulic system of our rail anchor driving machine, it will be noted that the fluid of said system is pumped from the reservoir 35 through a filter 36 and a hydraulic line 37 to the pump 31. From the pump 31, the fluid passes through a line 33 into the four-way valve 40 from which valve said fluid is directed to the hydraulic motor 38 and the hydraulic cylinders 70' and 70 in a well known manner.

The four-way valve 40 and the hydraulic motor 38 are provided with two interconnecting lines 41 and 42. When the hand control lever 130 is pivoted to the dotted-line position 130a, the hydraulic motor 38 is actuated by the flow of fluid through the line 41 to propel the anchor driving machine in a forward direction, and when said hand lever is in the dotted line position 130b, the flow of fluid is directed through line 42 and said motor is actuated to propel said machine in a rearward direction. The relatively medial position of the hand lever 130 shown in full-line represents a neutral or nondriving position.

The fluid which passes into the hydraulic motor 38 by either of the lines 41 or 42 is exhausted back to the reservoir 35 through an exhaust line 43 which connects said motor with said reservoir. The line 41 is provided with a speed governor 41a and the line 42 is provided with a governor 42a whereby the speed of the hydraulic motor 38 may be maintained at any desired speed, preferably, in the form shown, said speed being sufficient to propel the rail anchor driving machine at about one mile per hour.

Referring again to FIG. 30 and, additionally, to FIG. 8, the operation of the hydraulic cylinders 70' and 70 is effected by pivoting the hand lever 140. When the hand lever 140 is moved to the dotted-line position 140a, the fluid from the four-way valve 38 is directed to the cylinder 70, and when said hand lever is pivoted to the dotted-line position 140b, the fluid is directed from said valve to the cylinder 70'. Each of the cylinders 70 and 70' is provided with a counter balance valve integrally secured and interconnected therewith adjacent the lower end of said cylinder, the cylinder 70 having counter balance valve 150 and the cylinder 70' having counter balance valve 150'. Fluid from the four-way valve 40 is directed from said four-way valve through line 44 to a passage 48 in the counter balance valve 150 and from said counter balance valve through line 44a to the uppermost end of the cylinder 70. Lines 45 and 45a and passage 48' connect said four-way valve in a similar manner to the cylinder 70'. The counter balance valves 150 and 150' are provided with lines 46 and 47 respectively which connect said counter balance valves to the reservoir 35. The cylinders 70 and 70' and the counter balance valves 150 and 150' respectively associated therewith are substantially reverse images of each other, and the description of said cylinders will be directed primarily to the cylinder 70 which is associated with the support members 24a and 24b. It will be understood that the description of the parts associated with the cylinder 70 will apply also to the corresponding parts of the cylinder 70' associated with the support members 23a and 23b, said numbers of the parts of said cylinder 70' being primed to differentiate them.

The cylinder 70 has a hollow cylindrical bore 70a into which is slidably fitted a piston 171, the uppermost end of said cylinder being closed by means of a cap 70b welded or otherwise suitably secured thereto. The piston 171 is rigidly secured to the uppermost end of the piston rod 71, and when said piston rod is fully retracted by the springs 78, said piston is positioned a short distance from the uppermost end of the cylinder 70. The piston rod 171 projects downwardly through a central aperture 172a of a screw-thread fitted bushing 172 in the lowermost end of the cylinder 70; the lowermost end of said piston rod is pivotally attached to the rail anchor driver 72 at its medial pivot shaft 73 by means of the clevis 71b as hereinbefore described. The fluid line 44, the passage 48, and the line 44a afford continuous passage of the fluid into the cylindrical bore 70a of the cylinder 70 above the piston 171 whereby said piston, the piston rod 71, and the driver 72 are actuated. The piston 171 is provided with a ball check valve 172' which allows the trapped fluid below said piston to pass upwardly therethrough as said piston travels in a downward direction.

The counterbalance valve 150 has a cylindrical bore 151 (FIG. 8) which is axially parallel with the cylinder 70, and two interspaced superposed, fluid passages which are axially perpendicular to said cylindrical bore, an uppermost passage 152 and a lowermost passage 153. The passages 152 and 153 axially intersect and cross the bore 151, the medial portion 151a of said bore providing fluid communication between the passages 152 and 153, and the axes of said passages are right angularly disposed relative to the axis of the cylinder 70. The passage 152 interconnects the bore 70a of the cylinder 70, and the passage 153 intersects the line 46 which connects the counter-balance valve 150 with the reservoir 35. The ends of the passages 152 and 153 which are directed away from the cylinder 70 are interconnected by means of a check valve 154 which affords passage for fluid from passage 153 to passage 152 but which prevents a flow of said fluid in a reverse direction therethrough.

The bore 151 of the counter balance valve 150 has slidably interfitted therein a pair of axially aligned pistons 155 and 156 which are integrally connected and longitudinally interspaced by a valve stem 157. The pistons 155 and 156 are normally biased in an uppermost position as shown in FIGS. 8 and 30 by a spring 158 whereby the medial portion 151a of the bore 151 is closed by the piston 156 thereby preventing the flow of fluid between the passages 152 and 153. Above the piston 155, the bore 151 provides a fluid chamber 151b, said fluid chamber being interconnected with the passage 48 of the counter balance valve 150 by a pilot line 49.

When the hand lever 140 is pivoted to the position shown at 140a, the four-way valve 40 directs the flow of fluid through the line 44, the passage 48, and the line 44a to the cylinder 70 above the piston 171; the piston is thereby driven in a downward direction, and the trapped fluid below said piston passes upwardly through the ball check valve 172' during the downward motion of said piston. When the rail driver 72 contacts the rail anchor A, the resistance thereby effected to the downward movement of the piston 171 causes the pressure in the passage 48 and the lines 44 and 44a to be increased. The pressure in the fluid chamber 151b of the bore 151 above the pistons 155 also increases, and as the fluid enters said chamber through the pilot line 49, the piston 156 is moved downwardly thereby opening the passage 151a of said bore. With the passage 151 open, the trapped fluid below the piston 171 passes therethrough into the passage 153 and the line 46 into the reservoir 35. By means of the above recited operation of the counter balance valve 150, the speed and power of the downward thrust of the piston 171 is restrained until the driver 72 contacts the anchor A whereupon said counter balance valve opens and full power is applied to drive said anchor.

After the anchor A is driven, the operator returns the hand lever 140 to its relatively medial position thereby stopping the flow of fluid to the cylinder 70. As the pressure in the passage 48, the pilot line 49, and the fluid chamber 151b drop, the pistons 155 and 156 move upwardly and the passage 151a is closed. The piston 171 and the piston rod 71, upwardly biased by the exterior springs 78, retract to an uppermost position. During such retraction, the fluid above the piston 171 returns to the four-way valve 40 through the lines 44—44a and the passage 48 and is exhausted back to the reservoir 35 through an exhaust line 39 of said four-way valve; fluid from said reservoir is meanwhile drawn into the cylinder 70 below said piston by means of the line 46 and the passages 152 and 153, said fluid passing from passage 153 to passage 152 by way of the check valve 154.

When the hand lever 140 is moved to the dotted line position 140b (FIG. 30), the fluid is directed through the line 45, the passage 48', and the line 45a to actuate the cylinder 70' in substantially the same manner as the cylinder 70.

Referring now to FIG. 14, it will be noted that the brackets 112 and 112' which serve as supporting means for the pivot shaft 114 of the boom 111 extend forwardly from said pivot shaft a substantial distance. It will be further noted that two forwardly directed brackets 109 and 109' are relatively laterally disposed and evenly interspaced from the brackets 112 and 112' respectively by means of yoke members 106 and 106' respectively. The forwardly disposed ends of the brackets 112 and 109 provide journal means for an axially laterally disposed pedal shaft 108, said shaft being pivoted within bearing apertures 112b and 109a of the brackets 112 and 109 respectively. A pedal shaft 108' is similarly journaled within bearing apertures 112b' and 109a' of the brackets 112' and 109' respectively.

The brackets 112 and 112' are provided with outwardly laterally projecting brackets 107 and 107' respectively and said brackets 107 and 107' are parallel with and interposed from the forwardly disposed beam 11 and are provided with bearing apertures 107a and 107a' respectively.

The pedals 180 and 180' are freely pivoted upon the shafts 108 and 108' respectively and serve as part of the control mechanism for operating the rail anchor driving machine. The linkage and parts, which are actuated by movement of the pedals 180 and 180' respectively are substantially reverse images of each other in all of their operating characteristics. The following description will be directed primarily to the pedal 180 and its associated parts, and it will be understood that the reverse image parts associated with the pedal 180' have correspondingly identical numbers primed.

Referring now to FIGS. 14 and 25, the pedal 180 extends forwardly from the shaft 108 and has vertically downwardly projecting flanges 181 at the lateral edges thereof, said flanges having axially aligned apertures 181a adjacent the rearwardly disposed end of said pedal by which said pedal is pivoted upon the shaft 108. An actuating lever 182 is rigidly secured at one end thereof between the flanges 181 of the pedal 180 in any suitable manner such as by a cotter pin 182a. The lever 182 extends forwardly a substantial distance in the same direction as the pedal 180 and is positioned beneath said pedal. When the pedal 180 is in a horizontal position, as shown in solid lines in FIG. 25, the downwardly directed surface 183 of said pedal rests upon the lever 182, and when said pedal is pivoted to the dotted-line positions 180a and 180b, the lever 182 is similarly pivoted by said pedal. The pedals 180 may also be pivoted to a vertically upward position as shown in dotted-lines at 180c for such purposes as storage and transporting.

The pedal shaft 108 of the brackets 112 and 109 is provided with a beveled gear 185 rigidly secured thereupon by a cotter pin 185a. The gear 185 is positioned adjacent the bracket 112 and meshes with an axially right angularly disposed, diametrically smaller beveled gear 186 rigidly secured to the forwardly disposed end of a lever shaft 187. The lever shaft 187 extends from the bearing 189 of the beam 12 through suitable apertures in the beam 11 and the yoke 106 and through the bearing aperture 107a of the lateral bracket 107, and the gear 186 is positioned adjacent the forwardly disposed surface of said bracket.

The lever shaft 187 is provided with a clutch 190 positioned adjacent the rearwardly disposed surface of the bracket 107. The clutch 190 comprises a clutch disc 191 rigidly secured to the lever shaft 187 by a cotter pin 191a, and a clutch disc 192 pivoted upon said lever shaft. The clutch discs 191 and 192 are contiguously positioned relative to each other and are so formed on their mutually facing surfaces as to provide a lost motion connection between the disc 192 and the lever shaft 187.

The clutch disc 191 is provided with a rearwardly directed lug 191b (FIGS. 12, 22, and 25) which projects rearwardly beyond the plane of the forwardly disposed surface of the clutch disc 192 at a semicircular recess portion 192b of said disc 192. The lug 191b conforms to substantially 90° of the peripheral contour of the disc 191 and the recessed portion 192b covers substantially 180° of the disc 192. The lug 191b has two circumferentially oppositely facing surfaces 191c and 191d, and the disc 192 has two circumferentially oppositely facing surfaces 192c and 192d disposed at either end of the recess 192b. It will be understood therefore, that when the surface 191c of the lug 191b abuts the surface 192c of the recess 192b as shown in FIG. 15, the surfaces 191d and 192c are circumferentially interspaced substantially 90°.

The disc 192 of the clutch 190 is provided with a preferably integrally united, downwardly projecting lever 193. The lowermost end of the lever 193 provides pivotal attachment means for a clevis 194 of a control rod 195. The control rod 195 extends laterally outwardly from the center of the rail anchor driving machine and serves as connecting means to actuate a rail hooking device 200, herein later to be more fully described.

Referring now to FIGS. 14 and 18 through 23 and particularly to FIGS. 21 and 23, the hooking device 200 is pivotally suspended from the pivot shaft 63 upon which the adjustment screw 60 is pivotally mounted by means of two downwardly directed, interspaced, parallel hook support links 201 and 202. The pivot shaft 63 projects forwardly and rearwardly beyond the laterally inwardly disposed brackets 62 of the side plate 14 in which brackets said shaft is journaled. The support link 201 is rigidly secured to the pivot shaft 63 rearwardly of the brackets 62 by means of a cotter pin 201a, and the support link 202 is rigidly secured to said shaft forwardly of said brackets by means of a cotter pin 202a.

Referring now to FIG. 23, the downwardly directed ends of the support links 201 and 202 provide pivot means for a hook pivot shaft 203 which projects through apertures 201b and 202b respectively in said links. The hook pivot shaft 203 is freely journaled in the apertures 201b and 202b and extends forwardly and rearwardly beyond the support links 201 and 202. A rail hook 204 is rigidly secured to the hook pivot shaft 203 intermediate the support links 201 and 202, said shaft being telescopically interfitted with an aperture 204a of a mounting portion 204b of said hook. The rail hook 204 is secured against rotational movement relative to the hook pivot shaft 203 by means of a cotter pin 204c.

The forwardly directed portion of the hook pivot shaft 203 which projects forwardly beyond the link 202 is provided with a helically wound coil spring 206 telescoped over the shaft 203, one end of said spring being attached to a radially outwardly projecting end of a cotter pin 205 and the other end of said spring being attached to a forwardly projecting stud 202c of the support link 202. The spring 206 is circumferentially tensioned whereby the hook pivot shaft 203 is biased in a counterclockwise direction as shown in FIGS. 18 and 19 thereby urging the hook 204 into rail engaging contact with the rail R.

The rearwardly directed portion of the hook pivot shaft 203 which projects rearwardly beyond the link 201 is provided with a tubular sleeve 207 telescoped over said shaft and secured thereto against rotation or lateral displacement by means of a cotter pin 207a. Adjacent the support link 201, the sleeve 207 is provided with a radially outwardly projecting lug 207b (FIG. 23) adapted to abut a rearwardly directed stud 201c of the support link 201. The lug 207b and the stud 201c are so positioned as to limit the counterclockwise movement of the hook 204 to an optimum downward position substantially as shown in FIG. 19.

The hook 204 has integrally formed therewith a follower portion 204d. The follower 204d is laterally spaced from the hook 204 and is adapted to abut a laterally inwardly projecting hook lifting plate 208 which is welded or otherwise suitably secured to the lower edge of the adjacent side plate 14.

As best shown in FIG. 19, the rail hook 204 is so formed in cross-section and is so laterally outwardly hooked as to engage the inwardly directed lateral edge R1 of the adjacent rail R when said hook is pivoted to its downward or lowermost position. The rail hook 204 is pivoted from the position as shown in FIG. 18 to the position of FIG. 19 by pivotal motion of the pivot shaft 63, said pivot shaft being pivotally moved by a downwardly directed lever 197 connected to the control rod 195 by a clevis 196 at its lowermost end and integrally secured to a disc 211 of a clutch 210 at its uppermost end (FIG. 22).

Referring now to FIG. 21, the pivot shaft 63 extends forwardly through the beam 11 whereby the foremost end of said shaft is substantially laterally aligned with the control rod 195. The pivot shaft 63 has a diametrically reduced end portion 63a upon which the clutch 210 is positioned. The clutch disc 211 is freely pivoted upon the reduced end portion 63a and is maintained against forward endwise movement by means of a second clutch disc 212 which is secured to the shaft 63 by a cotter pin 212a. The clutch discs 211 and 212 are provided with axially directed overlapping lugs 211b and 212b respectively (FIG. 22), said lugs comprising mutually directed portions of said discs conforming to substantially 90° of the peripheral contours of said discs. The lug 211b has circumferentially facing surfaces 211c and 211d, and the lug 212b has similar surfaces 212c and 212d.

Referring now to FIGS. 21 and 23, it will be understood that the control rod 195 is biased in the direction of the lever 193 of the clutch 190 by the resilient pivotal tension of the spring 206 upon the rail hook 204. The follower 204d of the hook 204 presses against the lifting plate 203 thereby biasing the pivot shaft 63 in a clockwise direction through the support links 201 and 202; said pivot shaft is, however, held against such pivotal motion by the lugs 211 and 212 abutting at the surfaces 211c and 212c respectively thereof.

The control rod 195 is held against laterally inward movement by the clutch 190, the surface 192c of the disc 192 abutting the surface 191c of the lug 191b on the disc 191 (FIG. 22).

The lever shaft 187 is normally held against pivotal movement in response to pressure exerted by the control rod 195 through the lever 193 and the clutch 190, said holding being effected by a retraction spring 184 (FIG. 14). The retraction spring 184 is telescopically positioned over the lever shaft 187, the forwardly disposed end of said spring being attached to the forwardly disposed beam 11 by means of a stud 11a projecting rearwardly therefrom. The rearwardly disposed end of the retraction spring 184 is attached to a forwardly directed stud 198a of a positioner control lever 198, said control lever being rigidly secured to the lever shaft 187 by means of a cotter pin 198b. The radially outermost end of the positioner control lever 198 is pivotally connected to one end of a positioner control rod 199, the other end of said control rod being pivotally attached to the recited positioner device 90 at the lug 95a of the pivot arm 95 (FIG. 26).

The retraction spring 184 is circumferentially tensioned throughout its length whereby the lever shaft 187 is normally resiliently biased in a counterclockwise direction with sufficient force to maintain the pedal 180 in the substantially horizontal position as shown in FIG. 25; in such position, the lever 198 is maintained in the position as shown in full line in FIG. 26. The tension exerted by the spring 184 upon the lever shaft 187 is substantially greater than the counterdirected force of the spring 206 of the rail hook 204 acting through the control rod 195.

By referring to FIG. 14, it will be noted that in the reverse image parts controlled by the foot pedal 180', the spring 184' of the shaft 187' is anchored at a forwardly directed stud 11a' of the rearwardly disposed beam 12 in a manner substantially similar to the attachment of the spring 184 to the beam 11. All of the recited parts directly or indirectly responsive to the foot pedal 180 and all of the parts similarly responsive to the foot pedal 180' operate in a substantially identical manner, and the operation thereof, which is directed primarily to those parts associated with the foot pedal 180, is as follows:

The operator of the rail anchor driving machine occupies the seat 110 of the boom 111 and places his feet upon the pedals 180 and 180'. In this position, the control levers 130 and 140 are immediately in front of and readily accessible to the operator whereby he can control the motion and direction of said machine and the actuation of the recited rail anchor drivers 72 and 72' as hereinbefore disclosed.

When the operator places his feet upon the pedals 180 and 180', said pedals pivot downwardly from the weight of said feet; the pedal 180 acting through the gears 185 and 186, pivots the lever shaft 187 in a clockwise direction, as shown in FIG. 26 against the pressure of the spring 184; the clutch disc 191, pivoted clockwise as shown in FIG. 15, allows the control rod 195 to move laterally inwardly; the rail hook 204, in response to the spring 206, pivots downwardly to a rail engaging position, as shown in FIG. 19; and the positioner control lever 198, acting through the positioner control rod 199, pivots the positioner device 90 to the position 90a (dotted line) of FIG. 26. In such seated position, the operator, by means of the hand lever 130, propels the rail anchor driving machine along the track in either a forward or rearward direction. The downwardly directed positioner leg 92 of the positioner device 90 and the downwardly directed hook 204 do not interfere with the travel of the anchor driving machine, said positioner leg being spaced laterally inwardly away from the rail anchors A and said hook having tapers 204e at its forwardly and rearwardly directed ends whereby it is cammed away from any splice bars with which it may come in contact (FIG. 21). If the anchor driving machine approaches a switch, crossover, highway crossing or the like while traveling, the operator lifts his feet from the pedals 180 and 180' thereby allowing the positioner devices 90 and 90' and the rail hooking devices 200 and 200' to retract upwardly within the frame 10 to avoid striking the recited obstacles.

As the rail anchor driving machine approaches a prepositioned rail anchor R, the operator forcibly presses downwardly upon the pedal 180 or 180', whichever is nearest the rail to which said anchor is to be attached. When the pedal 180 is depressed to the position as shown at 180b in FIG. 25, the lever shaft 187 is further rotated in a clockwise direction whereby the positioner control lever 198 is moved to the dotted line position, as shown at 198b of FIG. 26, the positioner device 90 is thereby pivoted to the dotted line position 90b through the positioner control rod 199. In the position shown at 90b, the positioner leg 92 of the positioner device 90 is disposed to abut the rail anchor R, the positioner leg 92 pivots until one of the shock absorbers 96 abuts one of the bearings 52b or 53b and halts the motion of the anchor driving machine. The rail anchor driving machine can approach a rail anchor R while traveling in either a forward or rearward direction; if said machine is moving in a forward direction (with the operator moving backwardly), the rearwardly disposed shock absorber abuts the bearing 53b; if said machine is moving in a rearward direction, the forwardly disposed shock absorber abuts the bearing 52b.

After the positioner device 90 has contacted the rail anchor R, the anchor driving machine continues to press against said anchor, such pressure being effected by the hydraulic motor 38, and said anchor is firmly held against the adjacent rail tie during the anchor driving operation.

The pivoting of the positioner device 90 to its anchor-abutting position as shown at 90b in FIG. 26 causes the control rod 195 to be moved laterally inwardly beyond the position whereby the lever 197, through the clutch 210 releases the pivot shaft 63 and allows the hook 204 to pivot downwardly. Such further movement by the control rod 195 and the lever 197 is possible due to the lost motion connection of the clutch discs 211 and 212, the lug 211b being free to further pivot in a clockwise direction after the lug 212b of the disc 212 has stopped pivoting.

When a rail anchor driver 72 or 72' is actuated by the control lever 140, the four-way valve 40, and one of the cylinders 70 or 70', the side of the anchor driving machine which is opposite said actuated driver tends to be lifted from the adjacent rail R, but this is prevented by the hooks 204 which retain said machine against displacement from the said rail.

In FIGS. 31 through 34, we show a modified form of our rail anchor driving machine which is substantially similar in construction and operation to the hereinbefore described anchor driving machine of FIGS. 1 through 30, said modified form incorporating a rail blocking mechanism 220. The blocking mechanism 220 is positioned within the frame 10 at the laterally directed side thereof upon which the side plates 24a and 24b and the cylinder 70 are mounted, it being understood that a substantially identical blocking mechanism, not herein shown, would be similarly associated with the laterally oppositely disposed side of said frame.

The laterally disposed ends of the beams 11 and 12 adjacent the cylinder 70 are connected by means of a forwardly and rearwardly directed side beam 214 (FIG. 31). Laterally inwardly spaced from the side beam 214 are parallel plate members 215a and 215b, said plate members projecting rearwardly and forwardly from the beams 11 and 12 respectively. The plate members 215a and 215b are welded or otherwise suitably secured to the beams 11 and 12, the rearwardly projecting end of the plate 215a being laterally supported by means of an end plate 216a projecting laterally inwardly from the side beam 214, and the forwardly projecting end of the plate 215b being similarly supported by means of an end plate 216b (FIGS. 31, 32, and 34).

Referring now to FIG. 34, it will be understood that the plate member 215a, the end plate 216a, the forward beam 11, and the side beam 214 form a forwardly disposed rectangular housing 221a within which parts of the rail blocking mechanism are mounted, and that the plate members 215b, the end plate 216a, the rearward beam 12, and said side beam form a similar, rearwardly disposed housing 221b. The housing 221a is provided with two stop plates 218a and 219a, the stop plate 218a being contiguously parallel with and secured to the plate member 215a and the stop plate 219a being similarly secured to the side beam 214. The stop plates 218a and 219a extend rearwardly from the forward beam 11, and the rearwardly disposed ends of said stop plates terminate adjacent the longitudinally central portion of the housing 221a.

As best shown in FIG. 33, a support plate 217a, is welded or otherwise suitably secured to the forwardly disposed beam 11 adjacent its lower edge, said plate 217a being laterally secured at the ends thereof to the stop plates 218a and 219a. The support plate 217a has a vertically upwardly directed centering stud 222a which serves as centering means for the lowermost end of a coil spring 223a.

An hydraulic cylinder 224a is welded or otherwise suitably secured to the support member 24a substantially above the housing 221a, said cylinder 224a being coaxial with the stud 222a and having a downwardly projecting piston rod 225a. The lowermost end of the piston rod 224a has screw thread-fitted thereto a plunger pad 226a.

The plunger pad 226a has a downwardly directed centering stud 227a coaxially disposed relative to the centering stud 222a of the support plate 217a, the lowermost end of the stud 227a being vertically spaced away from the upwardly directed end of the stud 222a, and said stud 227a serving as centering means for the uppermost end of the spring 223a. The plunger pad 226a provides mounting means for a hoizontally disposed bracket 228a, which supports a rail block 231a. The bracket 228a is provided with an aperture 229a adjacent one end thereof by which it is telescoped over the plunger pad 226a, and said plunger pad is provided with a circumferentially continuous flange 230a at the lower end thereof whereby said bracket is retained against vertically downward displacement.

The bracket 228a projects horizontally outwardly from the plunger pad 226a in a rearward direction. The rail block 231a is secured to the lowermost surface of the bracket 228a adjacent the rearwardly disposed end of said bracket by means of bolts 232a. The rail block 231a is disposed rearwardly of the support plate 217a whereby it can project downwardly below the housing 221a when said rail block is in a lowermost position as shown in FIG. 33.

It will be understood that the rearwardly disposed portion of the rail blocking mechanism 220 associated with the housing 221b is a reverse image of that portion associated with the housing 221a in all of its parts, and the operation of both of said portions is substantially identical. The reverse image parts associated with the housing 221b are numbered identically with those associated with the housing 221a with the exception that the letter "b" is substituted for the letter "a" in all parts respectively.

The rail block actuating cylinders 224a and 224b are connected to the cylinder 70 adjacent its uppermost end by means of fluid lines 233a and 233b respectively and a T fitting 234. The T fitting 234 directs fluid from the cylinder 70 above the piston 171 to the rail block actuating cylinders 224a and 224b. It will be understood that the rail blocks 231a and 231b are normally held in a retracted, uppermost, nonblocking position by means of the springs 223a and 223b pressing upwardly against the brackets 228a and 228b respectively said springs also serving as retracting means for the piston rods 225a and 225b of the cylinders 224a and 224b. When fluid is directed to the cylinder 70 to drive a rail anchor as hereinbefore described, said fluid enters the rail block cylinders 224a and 224h through lines 233a and 233b thereby extending the piston rods 225a and 225b, compressing the springs 223a and 223b, and lowering the rail blocks 231a and 231b into rail blocking position.

The rail blocking position of the rail blocks 231a and 231b is best illustrated in FIG. 33 wherein the rail block 231a is shown in its lowermost position. The lowermost position of the rail block 231a is determined by the bracket 228a abutting the uppermost edges 238a and 239a of the stop plates 218a and 219a respectively. The lowermost end of the rail block 231a extends downwardly adjacent the rail R and is provided with an interchangeable shim 234a preferably bolted to the laterally inwardly directed surface of said rail block by means of a bolt 235a. The shim 234a provides means by which the rail block 231a may be adjusted to any size rail; said shim being of a size whereby the laterally innermost surface of said shim abuts the laterally outermost edge of said rail.

It will be understood, therefore, that when the cylinder 70 is actuated to drive a rail anchor; and before the rail anchor driver 72 contacts said anchor the rail blocking mechanism 220 is automatically actuated to lower the rail blocks 231a and 231b into rail blocking position. The purpose of the rail blocking mechanism 220 is to confine all of the forces resulting from the driving action of the rail anchor driver 72 to the rail on which the anchor is being applied. By so doing, the machine does not "shift" to the opposite rail. As soon as the driving arm 75 meets with resistance against a rail anchor, the reactionary forces tend to move the rail anchor driving machine in the opposite lateral direction, and without the use of the rail blocking mechanism 220, said machine would move in such direction until the flanges of the oppositely disposed wheels engaged the rail. This shifting results in an impact against the rail and wheel flanges which could result in damage to both the rail anchor driving machine and the rail, and in addition, causes loss of stroke in the rail anchor driver 72.

It will be understood that many departures from the details of our invention as it is herein described and illustrated may be made, such as changes in size and dimension, without, however, departing from the spirit of our invention or the scope of the appended claims.

What we claim is:

1. A rail anchor driving machine for driving pre-positioned rail anchors upon a rail in abutting relationship to a rail tie, an anchor driving member movable for alternate contacting and withdrawal from a rail anchor, actuating means for moving said anchor driving member into contact with said rail anchor, actuating means for moving said anchor driving member away from said rail anchor, a positioning device mounted upon said machine and adapted to abut said rail anchor for positioning of said driving member relative to said anchor and holding said anchor against said rail tie while said anchor is being driven.

2. A rail anchor driving machine comprising a frame having means adapted for traveling upon a pair of parallel rails, at least two driving members positioned on either side of said frame adjacent said rails, means mounted upon said frame for actuating said driving members and each of said driving members adapted to drive a rail anchor into interlocking engagement with one of said pair of rails when each of said driving members is actuated, and positioning means mounted to said frame and pivotal to a position to abut said rail anchor to halt the motion of said machine.

3. In a rail anchor driving machine for driving prepositioned rail anchors into interlocking engagement with a rail, means whereby said machine is adapted for travel upon a railroad track, a rail anchor driving member mounted on said machine, power means on said machine adapted to actuate said driving member whereby said driving member drives a rail anchor, a positioner device mounted on said machine for positioning said machine relative to a prepositioned rail anchor whereby said driving member is aligned with said rail anchor, seating means associated with said machine for supporting an operator, rail hooking means mounted to said machine adapted to engage said track to prevent vertical displacement of said machine, control means operable by said operator to simultaneously move said positioner device and said rail hooking means between operative and nonoperative positions.

4. A rail anchor driving machine comprising a frame having wheels whereby it is adapted for rolling engagement with a railroad track, a rail anchor driving member pivotally mounted upon said frame and adapted to pivot downwardly beneath the level of said frame whereby it drives a rail anchor, a hydraulically operated cylinder mounted upon said frame and adapted to actuate said driving arm, and a motor mounted on said machine and driving said rail anchor driving machine along said track.

5. A rail anchor driving machine comprising a frame having wheels whereby it is adapted for rolling engagement with a railroad track, at least one rail anchor driving member pivotally mounted upon said frame and adapted to pivot downwardly beneath the level of said frame whereby it drives a rail anchor, at least one hydraulically operated cylinder mounted upon said frame and adapted to actuate said driving member, a motor having means associated therewith for propelling said rail anchor driving machine along said track, and means whereby said rail anchor driving machine is held against vertical displacement from said track when said driving arm is actuated to drive a rail anchor.

6. A rail anchor driving machine comprising a frame having means whereby it is adapted for rolling engagement with a railroad track, a rail anchor driving member mounted upon said frame, means mounted upon said frame for actuating said driving member, means for propelling said rail anchor driving machine along said track, said driving member adapted to drive a rail anchor into interlocking engagement with a rail when said driving member is actuated, a positioner device mounted upon said frame and adapted to pivot downwardly to abut a prepositioned rail anchor whereby said rail anchor driving machine is halted at an optimum position for said driving member to drive said rail anchor.

7. A rail anchor driving machine for driving prepositioned rail anchors upon a rail, said machine comprising a frame for unitarily mounting all parts of said machine thereupon, said frame adapted for rolling engagement with a railroad track, said frame having seating means associated therewith for supporting an operator, a driving member mounted upon said frame and adapted to drive a rail anchor, actuating means mounted upon said frame and adapted to actuate said driving member, means mounted upon said frame for propelling said anchor driving machine along said track, control means accessible to said operator whereby the travel of said anchor driving machine and the actuation of said driving members is controlled by said operator, a positioner device mounted upon said frame and adapted to position said anchor driving machine whereby said driving member can drive a prepositioned rail anchor, a hooking device mounted upon said frame and adapted to retain said anchor driving machine against vertical displacement from said track, and control means accessible to said operator for actuating said positioner device and said hooking device.

8. A rail anchor driving machine for driving prepositioned rail anchors upon a rail, said machine comprising a frame, a hydraulic power source mounted upon said frame, said frame providing a pair of upstanding supports, a trunnion mount vertically adjustably mounted between said upstanding supports, a trunnioned cylinder pivotally mounted to said trunnion mount, a shaft mounted to said frame and positioned parallel with said track, a bell crank lever pivotally mounted to said shaft, said lever pivotable by said cylinder, means biasing said lever in a retracted position, one arm of said lever comprising an anchor driver adapted to pivot downwardly adjacent the base of said rail by means of said cylinder to drive said rail anchor.

9. A rail anchor driving machine for driving a rail anchor prepositioned upon a rail adjacent a rail tie comprising a frame adapted for rolling engagement with a pair of rails, a motor for propelling said frame, means on said frame supporting a cylinder, a driver arm pivotally mounted to said frame to move in a plane transverse to said rails, said arm pivotal by said cylinder, means mounted to said frame adapted to abut said rail anchor to stop the motion of said frame and position said driver arm at the optimum position for driving said anchor, said driver pivotable to contact said rail anchor for the driving thereof, and a blocking device mounted to said frame and adapted to abut said rail to provide a reactive force to the force exerted by said driver arm.

10. A rail anchor driving machine for driving prepositioned rail anchors upon a rail, said machine comprising a frame having rail type wheels adapted for traveling upon a railroad track, a hydraulic power source mounted upon said frame, upstanding supports mounted upon either side of said frame, a pair of trunnion mounts vertically adjustably mounted to said upstanding supports, a pair of trunnioned cylinders pivotally mounted to said trunnion mounts, a pair of bell crank levers pivotally mounted to shafts provided adjacent either side of said frame, said levers pivotal downwardly by said cylinders, means for retracting said levers in an upward direction associated with said supports, one arm of each of said levers comprising an anchor driver adapted to pivot downwardly adjacent the base of said rail to drive a rail anchor, positioners pivotally mounted upon said shafts and adapted to pivot downwardly to laterally abut said anchor, shock absorber means associated with said positioners, hydraulic motor means associated with at least one of said wheels adapted to propel said machine in either direction along said tracks, rail hooks pivotally mounted adjacent the side of said frame adapted to pivot downwardly to engage said rails, a pair of control means so linked with said positioners and said rail hooks that by actuating one of said control means a positioner and rail hook on one side of said machine pivot downwardly, a separate pair of control means adapted to respectively direct fluid from said hydraulic power source to said motor means and to said cylinders, said machine adapted to approach an anchor prepositioned on either rail from either direction whereby when the adjacent positioner is lowered said positioner abuts said anchor and said machine is stopped, said shock absorber means adapted to absorb the shock of said stop, said positioner thereby aligning the adjacent driver arm to drive said anchor when fluid is directed to the cylinder associated with said driver, and a pair of rail blocking devices mounted to said frame at either side thereof movable to abut the adjacent rail to provide a reactive force to the force exerted by said rail anchor drivers.

11. A rail anchor driving machine for driving prepositioned rail anchors upon a rail, said machine comprising a frame having rail type wheels adapted for traveling upon a railroad track, upstanding supports mounted upon said frame, a cylinder mounted to said supports, a shaft mounted to said frame, a bell crank lever pivotally mounted upon said shaft, said lever pivotal by said cylinder, spring means biasing said lever in an upward direction, one arm of said lever comprising an anchor driver adapted to pivot downwardly adjacent the base of said rail to drive a rail anchor, a positioner pivotally mounted upon said shaft and adapted to pivot downwardly to laterally abut said anchor, shock absorber means associated with said positioner, a hydraulic motor associated with at least one of said wheels adapted to propel said machine in either direction along said tracks, a rail hook pivotally mounted to said frame and adapted to pivot downwardly to engage said rail, said frame having a forwardly cantilevered boom positioned parallel with said track, a seat for an operator mounted to the forward end of said boom, a pivoted foot pedal projecting forwardly from said frame and accessible to said operator, said foot pedal so linked with said positioner and said rail hook that by pivoting said pedal downwardly the positioner and rail hook also pivot downwardly, a pair of control means actuable by said operator adapted to respectively actuate said motor and said cylinder, said machine adapted to approach an anchor from either direction whereby when said positioner is lowered said positioner abuts said anchor and said machine is stopped, said shock absorber means adapted to absorb the shock of said stop, and said positioner thereby aligning said driver arm to drive said anchor when said cylinder is actuated.

12. A rail anchor driving machine for driving a prepositioned rail anchor upon a rail, said machine comprising a frame having rail type wheels adapted for traveling upon a railroad track, a hydraulic power source mounted upon said frame, upstanding supports mounted upon either side of said frame, a pair of cylinders mounted to said supports, a pair of shafts mounted adjacent either side of said frame, a pair of bell crank levers pivotally mounted upon said shafts, said levers pivotal downwardly by said cylinders, spring means biasing said levers in an upward direction, one arm of each of said levers comprising an anchor driver adapted to pivot downwardly adjacent the base of said rail to drive a rail anchor, positioners pivotally mounted upon said shaft and adapted to pivot downwardly to laterally abut said anchor, shock absorber means associated with said positioners, hydraulic motor means associated with at least one of said wheels adapted to propel said machine in either direction along said tracks, rail hooks pivotally mounted adjacent the sides of said frame adapted to pivot downwardly to engage said rails, said frame having a forwardly cantilevered boom positioned parallel with said track, a seat for an operator mounted to the forward end of said boom, a pair of pivoted foot pedals projecting forwardly from said frame and accessible to said operator, said foot pedals so linked with said positioners and said rail hooks that by pivoting one of said pedals downwardly the positioner and rail hook on the corresponding side of said machine also pivots downwardly, a pair of control means actuable by said operator adapted to respectively direct fluid from said hydraulic power source to said motors and to said cylinders, said machine adapted to approach an anchor prepositioned on either rail from either direction whereby when the adjacent positioner is lowered said positioner abuts said anchor and said machine is stopped, said shock absorber means adapted to absorb the shock of said stop, and said positioner thereby aligning the adjacent driver arm to drive said anchor when fluid is directed to the cylinder associated with said driver.

13. A rail anchor driving machine for driving prepositioned rail anchors upon a rail, said machine comprising a frame having rail type wheels adapted for traveling upon a railroad track, a hydraulic power source mounted centrally of said frame, upstanding supports mounted upon either side of said frame, a pair of trunnion mounts vertically adjustably mounted to said upstanding supports, a pair of trunnioned cylinders pivotally mounted to said trunnion mounts, a pair of bell crank levers pivotally mounted to shafts provided adjacent either side of said frame, said levers pivotal downwardly by said cylinders, spring means biasing said levers in an upward direction, one arm of each of said levers comprising an anchor driver adapted to pivot downwardly adjacent the base of said rail to drive a rail anchor, positioners pivotally mounted upon said shafts and adapted to pivot downwardly to laterally abut said anchor, shock absorber means associated with said positioners, hydraulic motor means associated with at least one of said wheels adapted to propel said machine in either direction along said tracks, rail hooks pivotally mounted adjacent the sides of said frame adapted to pivot downwardly to engage said rails, said frame having a forwardly cantilevered boom positioned parallel with said track, a seat for an operator mounted to the forward end of said boom, a pair of pivoted foot pedals projecting forwardly from said frame and accessible to said operator, said foot pedals so linked with said positioners and said rail hooks that by pivoting one of said pedals downwardly the positioner and rail hook on the corresponding side of said machine also pivots downwardly, a pair of control means actuable by said operator adapted to respectively direct fluid from said hydraulic power source to said motors and to said cylinders, said machine adapted to approach an anchor prepositioned on either rail from either direction whereby when the adjacent positioner is lowered, said positioner abuts said anchor and said machine is stopped, said shock absorbers adapted to absorb the shock of said stop, and said positioner thereby aligning the adjacent driver arm to drive said anchor when fluid is directed to the cylinder associated with said driver.

14. An apparatus for applying a rail anchor to the base of a railroad track, comprising, a supporting framework adapted for movement on a railroad track, an anchor applying means mounted on the framework including an anchor driving means for forcing said rail anchor that has been prepositioned on the rail base onto the rail base.

15. An apparatus for applying a rail anchor to the base of a railroad track rail, comprising, a supporting framework, an anchor holding mechanism mounted on the framework including means for holding the rail anchor prepositioned on the rail base in predriving position against the rail base, and anchor applying mechanism mounted on the framework including a driving means for forcing the rail anchor held by said holding means onto the rail base.

16. An apparatus for applying a rail anchor to the base of a railroad track rail, comprising, a supporting framework adapted for movement along a railroad track, an anchor holding mechanism mounted on the framework including a holding means for moving the rail anchor prepositioned on the rail base longitudinally of the rail into predriving position against a rail tie, and an anchor applying mechanism mounted on the framework including a driving means for forcing said rail anchor onto the rail base while held tightly against the side of said tie by said holding means.

17. A rail anchor driving machine for driving prepositioned rail anchors upon a rail, rail anchor driving means mounted upon said machine, positioning means mounted on said machine to abut one of said rail anchors for positioning said driving means for driving said prepositioned rail anchors, means whereby said driving means is brought into driving engagement with said rail anchor and is withdrawn therefrom.

References Cited in the file of this patent
UNITED STATES PATENTS

| | | |
|---|---|---|
| 2,575,535 | Talboys et al. | Nov. 20, 1951 |
| 2,669,041 | Fox et al. | Feb. 16, 1954 |
| 2,730,962 | Wright | Jan. 17, 1956 |

OTHER REFERENCES

Railway Track and Structure Cyclopedia, 1955, 8th edition, chapter 21, pages 297–308, "Rail Anchors."